United States Patent [19]

Taniguchi et al.

[11] Patent Number: 5,208,621

[45] Date of Patent: May 4, 1993

[54] PHOTOGRAPHIC SYSETM CAPABLE OF RECORDING THEREIN PHOTOGRAPHING DATA AND READING OUT THE SAME AND FILM STRUCTURE FOR USE IN THE PHOTOGRAPHIC SYSTEM

[75] Inventors: Nobuyuki Taniguchi; Manabu Inoue; Reiji Seki; Katsuyuki Nanba, all of Osaka, Japan

[73] Assignee: Minolta Camera Kabushiki Kaisha, Osaka, Japan

[21] Appl. No.: 902,589

[22] Filed: Jun. 22, 1992

Related U.S. Application Data

[60] Division of Ser. No. 768,332, Sep. 30, 1991, abandoned, which is a continuation of Ser. No. 488,999, Mar. 6, 1990, abandoned.

[30] Foreign Application Priority Data

| Mar. 6, 1989 | [JP] | Japan | 1-053389 |
| Mar. 6, 1989 | [JP] | Japan | 1-053390 |
| Mar. 6, 1989 | [JP] | Japan | 1-053391 |
| Mar. 6, 1989 | [JP] | Japan | 1-053392 |

[51] Int. Cl.$^5$ .................................... G03B 7/00
[52] U.S. Cl. ....................... 354/21; 354/289.1
[58] Field of Search ............... 354/21, 105, 106, 289.1

[56] References Cited

U.S. PATENT DOCUMENTS

| 4,311,377 | 1/1982 | Matteson | 354/217 |
| 4,437,742 | 3/1984 | Taniguchi | 354/21 |
| 4,443,077 | 4/1984 | Tanikawa | 354/21 |
| 4,477,164 | 10/1984 | Nakai et al. | 354/286 |
| 4,500,183 | 2/1985 | Tanikawa | 354/21 |
| 4,560,267 | 12/1985 | Nakai et al. | 354/412 |
| 4,650,304 | 3/1987 | Harvey | 354/21 |
| 4,728,978 | 3/1988 | Inoue et al. | 354/289.1 |
| 4,780,735 | 10/1988 | Taniguchi et al. | 354/202 |
| 4,783,672 | 11/1988 | Wirtz et al. | 354/21 |
| 4,862,201 | 8/1989 | Taniguchi et al. | 354/105 |
| 4,884,092 | 11/1989 | Inoue et al. | 354/289.1 |
| 4,887,115 | 12/1989 | Inoue et al. | 354/289.1 |
| 4,945,365 | 7/1990 | Fujino | 354/21 |

FOREIGN PATENT DOCUMENTS

| 62-63721 | 5/1977 | Japan . |
| 60-83925 | 5/1985 | Japan . |
| 61-113048 | 5/1986 | Japan . |
| 61-137143 | 6/1986 | Japan . |
| 63-285532 | 11/1988 | Japan . |
| 1-289948 | 11/1989 | Japan . |

OTHER PUBLICATIONS

Japanese Camera Exhibition Catalog, vol. 73, 1982.

Primary Examiner—Michael L. Gellner
Assistant Examiner—Howard B. Blankenship
Attorney, Agent, or Firm—Burns, Doane, Swecker & Mathis

[57] ABSTRACT

A photographic system comprises a camera and a film structure which can be loaded in the camera and in which photographing data can be recorded. The film structure has an image recording section in which a photographed image is recorded and a memory means for storing therein identification data peculiar to the film structure. And the camera inputs the identification data stored in the film structure into the camera and judges according to the inputted identification data whether the film structure is fit for the camera or not. Thereby, the photographing data can be recorded or read only when the film structure is fit for the camera.

Further, the present invention also relates to a film structure which can be loaded in a camera having peculiar identification data so that it is judged whether the film structure is fit for the camera or not.

5 Claims, 17 Drawing Sheets

FIG. 5
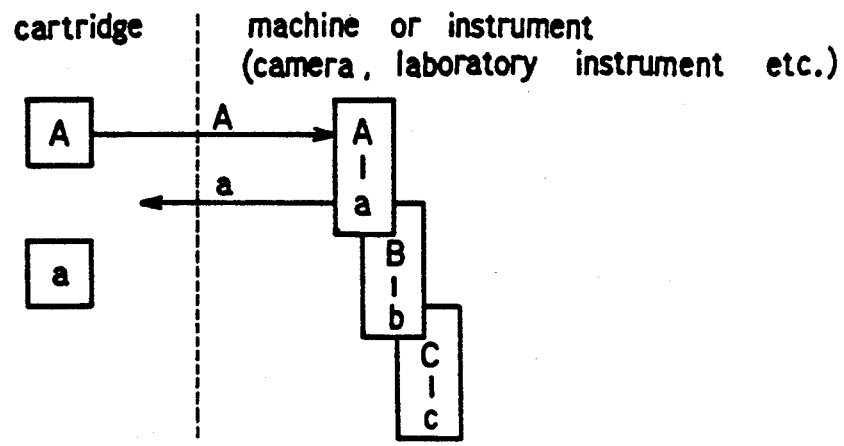
FIG. 6-a
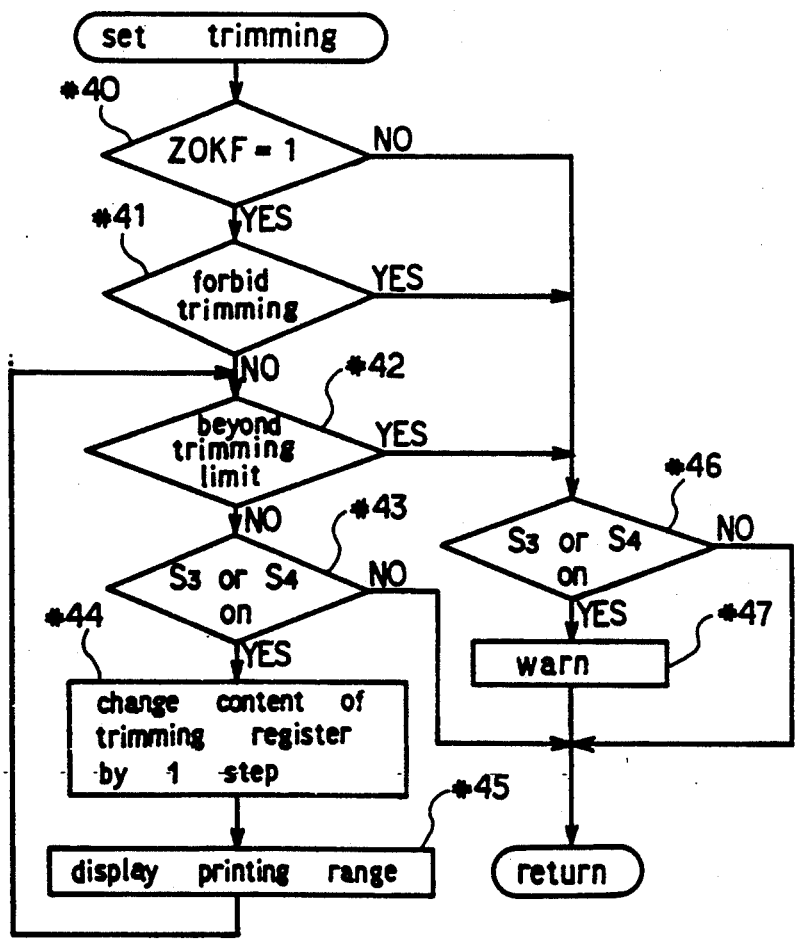

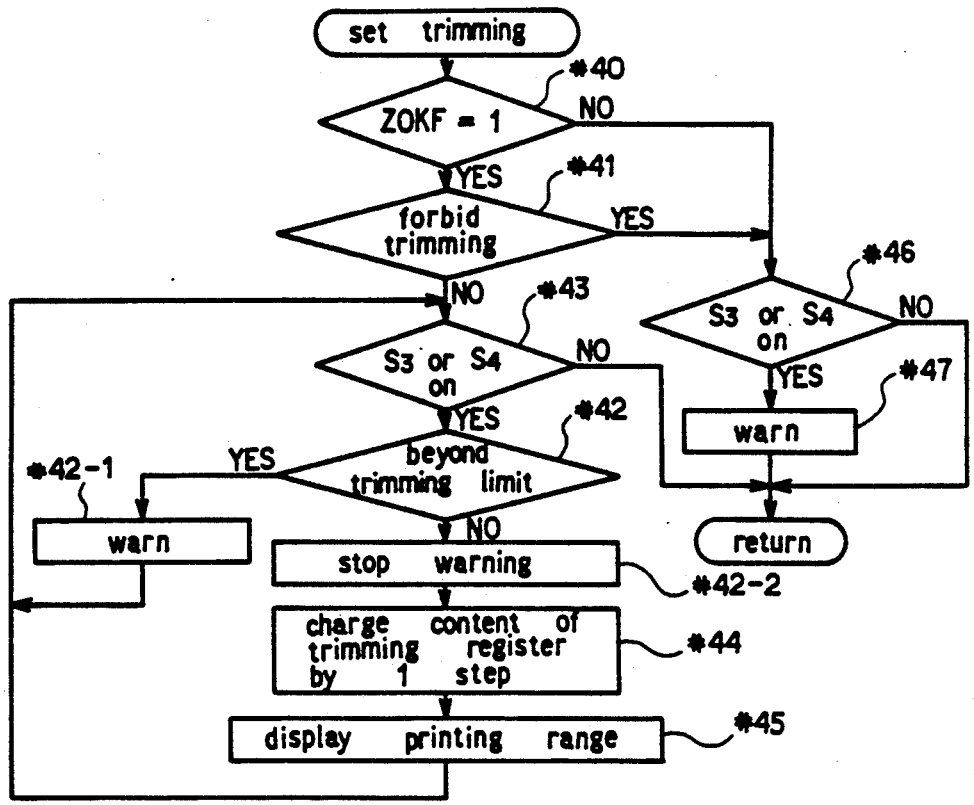
FIG. 6-b
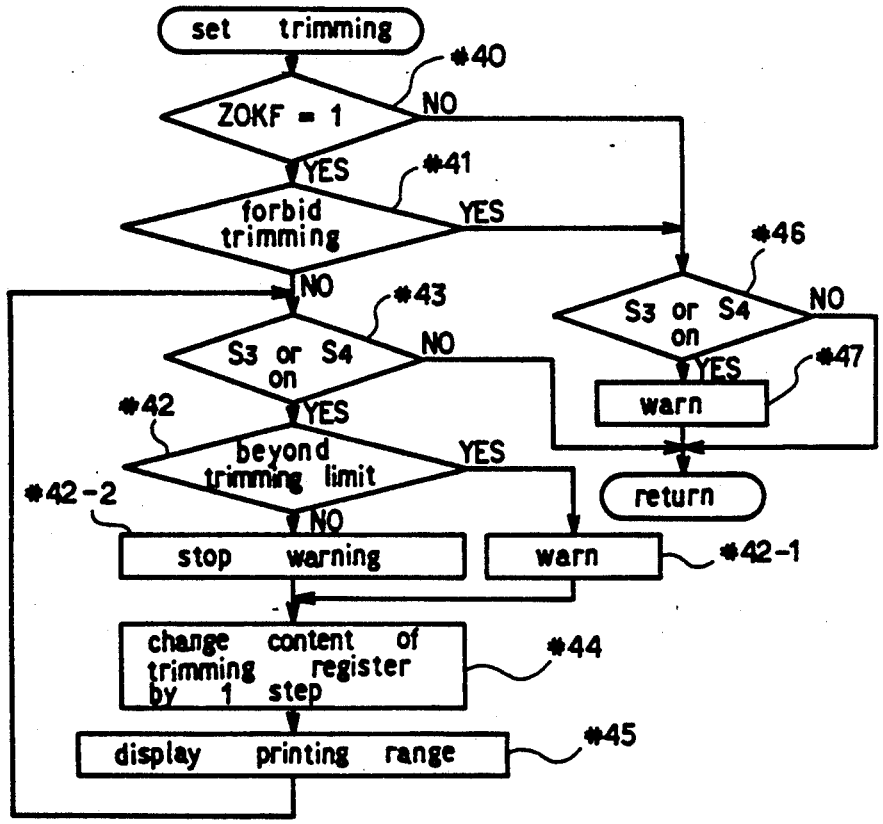
FIG. 6-c

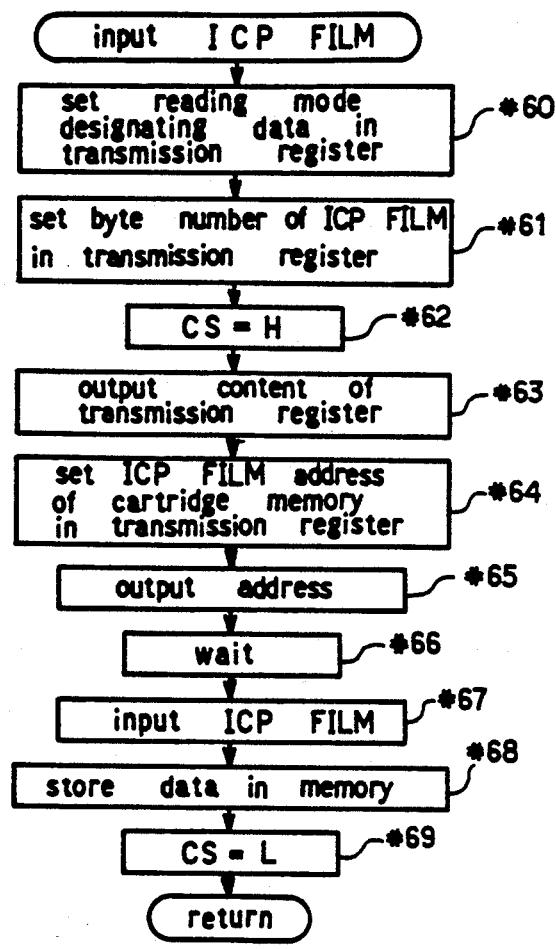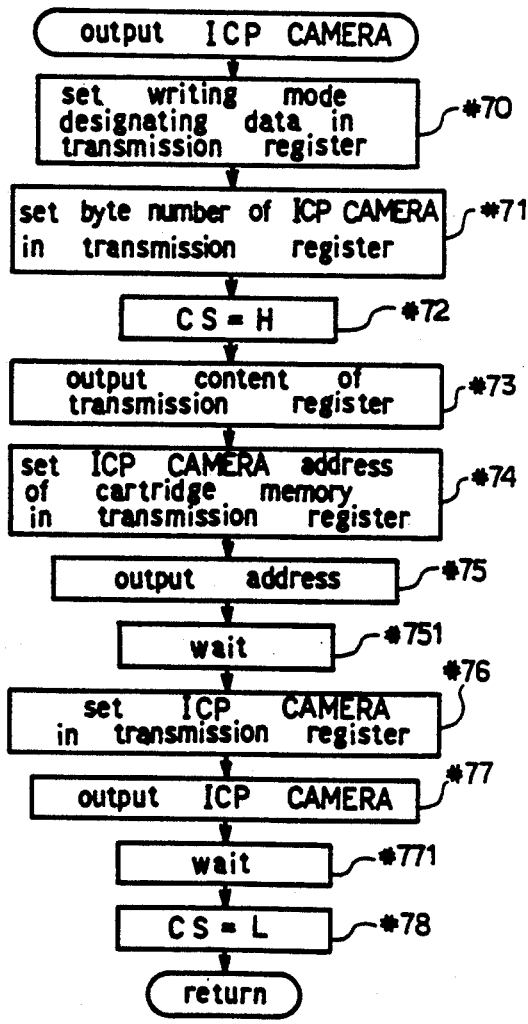

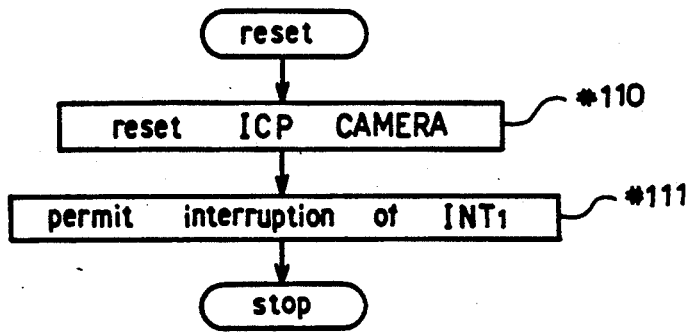
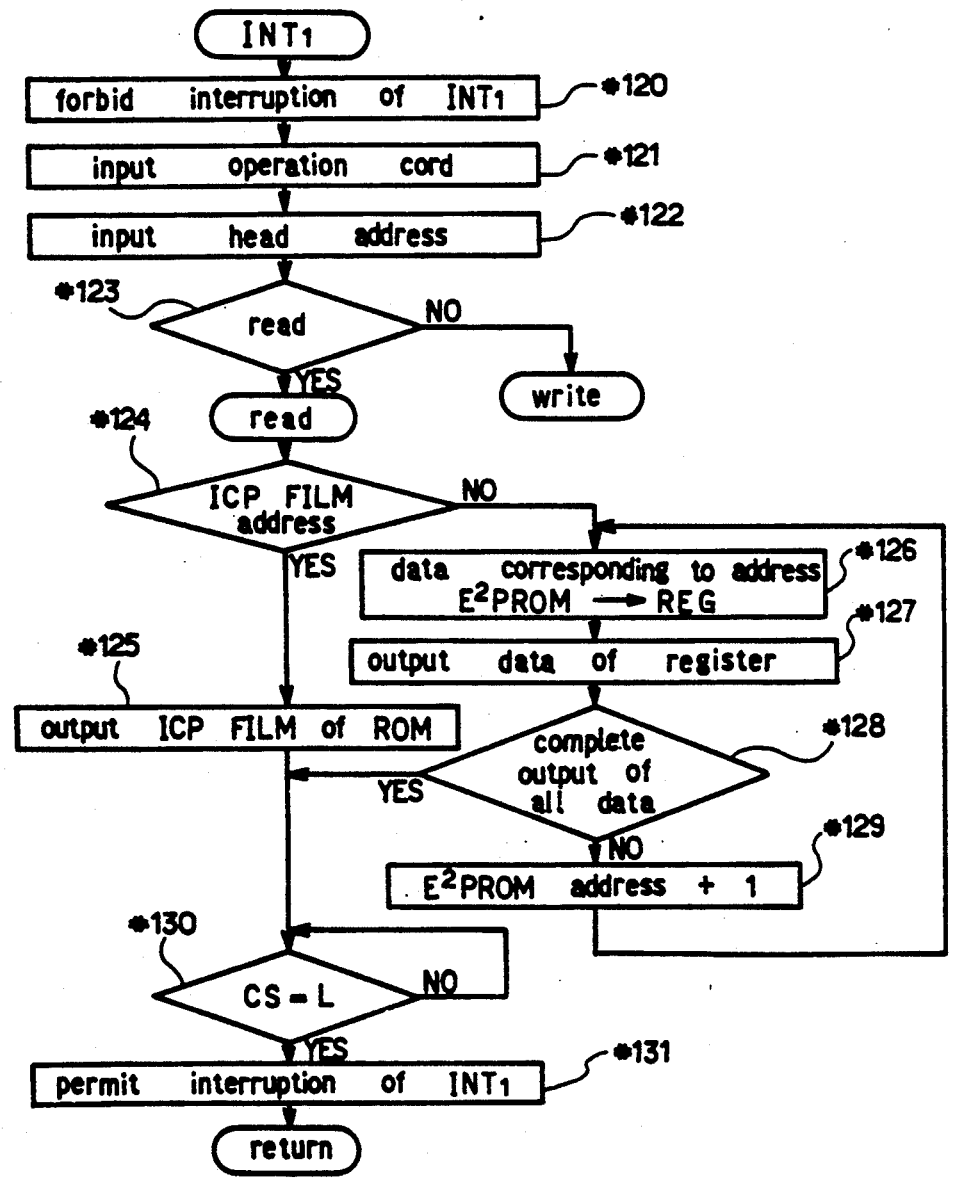

FIG. 16

| LOWER ADDRESS | UPPER 2-BIT 00 | 01 | 10 | 11 |
|---|---|---|---|---|
| 00H | FILM COUNTER | | | |
| 01H | PHOTOGRAPHING YEAR OF 1ST FRAME | PHOTOGRAPHING YEAR OF 10TH FRAME | PHOTOGRAPHING YEAR OF 19TH FRAME | PHOTOGRAPHING YEAR OF 28TH FRAME |
| 02H | PHOTOGRAPHING MONTH | | | |
| 03H | PHOTOGRAPHING DATE | | | |
| 04H | TRIMMING MAG. OF 1ST FRAME | | | |
| 05H | COLOR TEMPERATURE CAMERA POSITION | | | |
| 06H | PHOTOGRAPHING COMMENT OF 1ST FRAME | ↓ | ↓ | ↓ |
| | ↓ | | | |
| 0FH | PHOTOGRAPHING YEAR OF 2ND FRAME | PHOTOGRAPHING YEAR OF 11TH FRAME | PHOTOGRAPHING YEAR OF 20TH FRAME | PHOTOGRAPHING YEAR OF 29TH FRAME |
| | ↓ | ↓ | ↓ | ↓ |
| 80H | DEVELOPING RECEIPT YEAR | EMULSION NO. | ISO SENSITIVITY | |
| 81H | DEVELOPING RECEIPT MONTH | | NUMBERS OF FILM | |
| 82H | DEVELOPING RECEIPT DATE | CUSTOMER CODE | LATITUDE DATA | |
| 83H | KIND OF PRINT | | NEGATIVE/POSITIVE DATA | |
| 84H | NUMBER OF PRINT SHEET OF 1ST FRAME | SHOP CODE | LIMIT OF PSEUDO FOCAL LENGTH SETTING | |
| 85H | NUMBER OF PRINT SHEET OF 2ND FRAME | RECEIPT YEAR | EFFECTIVE LIFE YEAR | |
| 86H | | RECEIPT MONTH | EFFECTIVE LIFE MONTH | |
| 87H | | RECEIPT DATE | ICP FILM | |
| 88H | | PRINTING DATA OF 1ST FRAME | ICP CAMERA REF. | |
| 89H | | PRINTING DATA OF 2ND FRAME | MONOCHROME/COLOR | |
| | ↓ | ↓ | | |
| FFH | | | | |

PHOTOGRAPHIC SYSETM CAPABLE OF RECORDING THEREIN PHOTOGRAPHING DATA AND READING OUT THE SAME AND FILM STRUCTURE FOR USE IN THE PHOTOGRAPHIC SYSTEM

This application is a divisional, of application Ser. No. 07/768,332, filed Sep. 30, 1991, now abandoned, which is a continuation of application Ser. No. 07/488,999, filed Mar. 6, 1990, now abandoned.

BACKGROUND OF THE INVENTION

The present invention relates a photographic system comprising a camera and a film structure which can be loaded in the camera and having a function of executing recording in and reading out photographing data between the camera and the film structure.

It is conventionally known that a recording medium such as a semiconductive memory is loaded in a camera so that photographing data are recorded in the recording medium, and the recorded data are read out of the recording medium and used at the time of development. For example, when the data are pseudo focal length photographing data, a range in the film narrower than a normal photographing range can be automatically printed according to the pseudo focal length photographing data.

In such a camera system, it is necessary to judge whether a recording medium to be loaded in a camera is practically fit for the camera or not, and various kinds of judging ways have been proposed.

For example, in Japanese Laid-Open Patent Publication No. 62-208029 (U.S. Pat. No. 4,728,978), it is disclosed that when an IC card as a recording medium is loaded in a camera, data such as an electric source voltage, frequency and others of the IC card side are outputted to the camera side so as to judge whether the IC card is fit for the camera or not. However, in this reference, a film cartridge is neither used also as a recording medium for the photographing data nor has the IC card as an integrated part.

Further, in Japanese Laid-Open Patent Publication No. 62-40440 (U.S. Pat. No. 4,650,304), it is disclosed that data such as pseudo focal length photographing data are recorded in a film of a special film cartridge, and the special film cartridge and a cartridge loading chamber of a camera are so constructed that operation of recording a pseudo focal length photographing data and the like can be executed only when a predetermined special film cartridge is loaded in the camera. However, in a device disclosed in this reference, only whether a film cartridge is mechanically fit for the camera or not is judged, without judging whether electrical data communication between the camera and the film cartridge can be executed or not.

Further, for example, in Japanese Laid-Open Patent Publication No. 56-154720 (U.S. Pat. No. 4,500,183), it is disclosed that a film cartridge is provided with a recording medium for recording photographing data, but there is no disclosure relating to judgment whether the film cartridge is fit for the camera or not. And in a device disclosed in this reference, since all data are renewedly recorded at every photographing time, all data are recorded irrespective of a photographer's will and the former stored data are fully erased.

However, among various kinds of data, data such as an optionally given comment is not necessarily recorded in each film frame but is has only to be recorded when a photographer desires. Further in the abovementioned device disclosed in the above reference, since unnecessary data are also recorded, high-speed processing of the recorded data in each film frame is limited.

It has been conventionally known that in such a kind of camera, the range size to be printed which is designated in the pseudo focal length photographing operation is limited according to the film sensitivity (ISO) and when the range size of printing reaches the limit value, it is set over a predetermined range (see, for example, Japanese Laid-Open Patent Publication No. 62-50745 (U.S. Pat. No. 4,780,735)). This is because the graininess of a film becomes worse as the magnification of printing becomes high, and it tends to become worse especially as the film sensitivity becomes high.

However, even when the film sensitivities of films are the same, the graininess of the films are different from each other. Further, it is required, if a photographer desires, to continuously set the range size to be printed even when the range size becomes below the limit value.

SUMMARY OF THE INVENTION

An object of the present invention is to provide a photographic system capable of correctly judging whether a film structure is fit for a camera or not by electrically communicating signals between the camera and the film structure.

Another object of the present invention is to provide a photographic system capable of recording therein photographing data and reading out the same, in which photographing data can be recorded in and read out only when a film structure is fit for the camera of the photographic system, and erroneous operation of the system and degradation of a photographed image can be prevented from occurring when a film structure is not fit for the camera.

A further object of the present invention is to provide a film structure for use in a photographic system, capable of correctly judging whether the film is fit for the camera of the photographic system or not by electrically communicating signals between the camera and the film structure.

A further object of the present invention is to provide a film structure for use in a photographic system, capable of reading photographing data out and writing the same in only when the film structure is judged to be fit for the camera, and of preventing erroneous operation of the system and degradation of a photographed image from occurring when the film structure is not fit for the camera.

A further object of the present invention is to provide a camera capable of recording predetermined data at the end of every photographing in a recording medium loaded in the camera, and any data other than the abovementioned predetermined data by operating an operating means only when a photographer desires, thereby preventing unnecessary data from being recorded, increasing the speed of data recording operation at the time of photographing.

A further object of the present invention is to provide a camera capable of giving an alarm to a photographer when the designated range size to be printed is below a limit value determined, thereby preventing degradation of a photographed image.

BRIEF DESCRIPTION OF THE DRAWINGS

FIG. 5 is a view explaining ID codes communicated between the camera side and the film cartridge side, FIGS. 6 (a) (b) (c) are flow charts showing the trimming magnification setting operation, FIG. 8 is a flow chart showing the ICP FILM code inputting operation, FIG. 9 is a flow chart showing the ICP CAMERA code inputting operation, FIG. 13 is a flow chart showing the reset operation, FIG. 14 is a flow chart showing the INT1 routine, FIG. 16 is a view showing the relation between the address of the memory in the film cartridge and data.

DETAILED DESCRIPTION OF THE EMBODIMENTS

Figure 1:
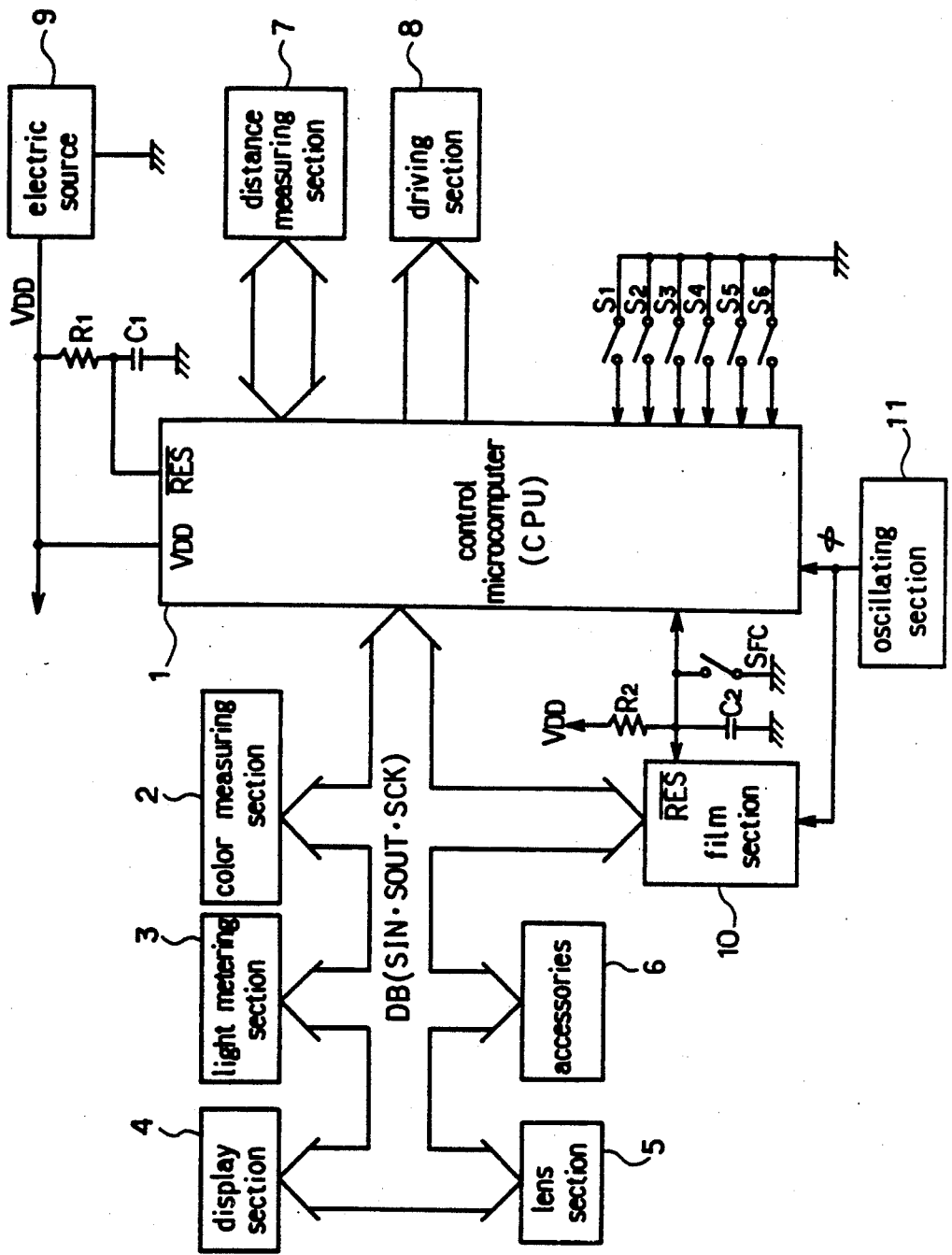
FIG. 1 is a structural block diagram of a photographic system of an embodiment of the present invention.

FIG. 1 is a block diagram of the whole of a system comprising a camera body and a film section which is an embodiment of the present invention.

A control microcomputer (hereinafter referred to as CPU) 1 controls the whole of the camera. A color measuring section 2 for measuring the light source color of an object to be photographed and a light metering section 3 for metering the brightness of the object output data obtained by the color measuring and the light metering respectively as digital data to the CPU 1. A display section 4 comprising a liquid crystal display (LCD) and others displays various kinds of photographing data on a liquid crystal plate provided on the camera body and in a viewfinder. A lens section 5 outputs lens data relating to photographing and automatic focusing to the CPU 1. Accessories 6 comprise an electronic flashing device, a data imprinting device, a comment input section which will be described later, and others. A distance measuring section 7 measures the distance from the camera to an object to be photographed by means of a CCD or the like.

A driving section 8 controls the aperture size and the shutter speed according to the AV and TV calculated in the CPU 1, and also controls film winding and rewinding, cocking of the shutter mechanism, quick return mirror and other mechanisms, and automatic focusing of the lens. An electric source 9 is provided in the camera body for supplying the CPU 1 and other blocks with electricity. The film section 10 includes a film cartridge (hereinafter referred to only as cartridge) and a film, the detail of which will be described later.

Now, switches will be described in the following.

A switch S1 is used for starting color measuring, distance measuring and light metering. A switch S2 is a release switch for starting exposure control. Switches S3 and S4 are used for a pseudo focal length photographing to set the range of the film to be printed which will be described later, so that the range of printing can be reduced by one step every time the switch S3 is turned ON and the range can be enlarged by one step every time the switch S4 is turned On. A switch S5 is used for inputting a comment, and it is turned ON when a comment is inputted. Switch S6 comprises a mercury switch or the like and used for detecting a longitudinal, lateral, upper or lower camera attitude. And data detected by the camera attitude detecting switch S6 are written in an $E^2PROM$ (described later) provided in the cartridge. Embodiments of the camera attitude detecting switch S6 are described in Japanese Laid-Open Patent Publication No. 59-17543 and Japanese Laid-Open Patent Publication No. 63-255611. A switch $S_{FC}$ is a cartridge detecting switch which is turned on when a cartridge is loaded in the camera.

A resister R1 and a capacitor C1, and a resister R2 and a capacitor C2 are connected to the CPU 1 and a reset terminal $\overline{RES}$ of the film of the film section 10 respectively and execute power-on resetting. An oscillating section 11 outputs system clocks $\phi$ to the CPU 1 and a circuit in the cartridge in the film section 10. The CPU 1 and each of the abovementioned sections 2, 3, 4, 5, 6, 10 are connected together by a serial data bus DB comprising a serial input line SIN, a serial output line SOUT and a serial clock line SCK, and the CPU 1 executes serial communication with each section.

Figure 2:
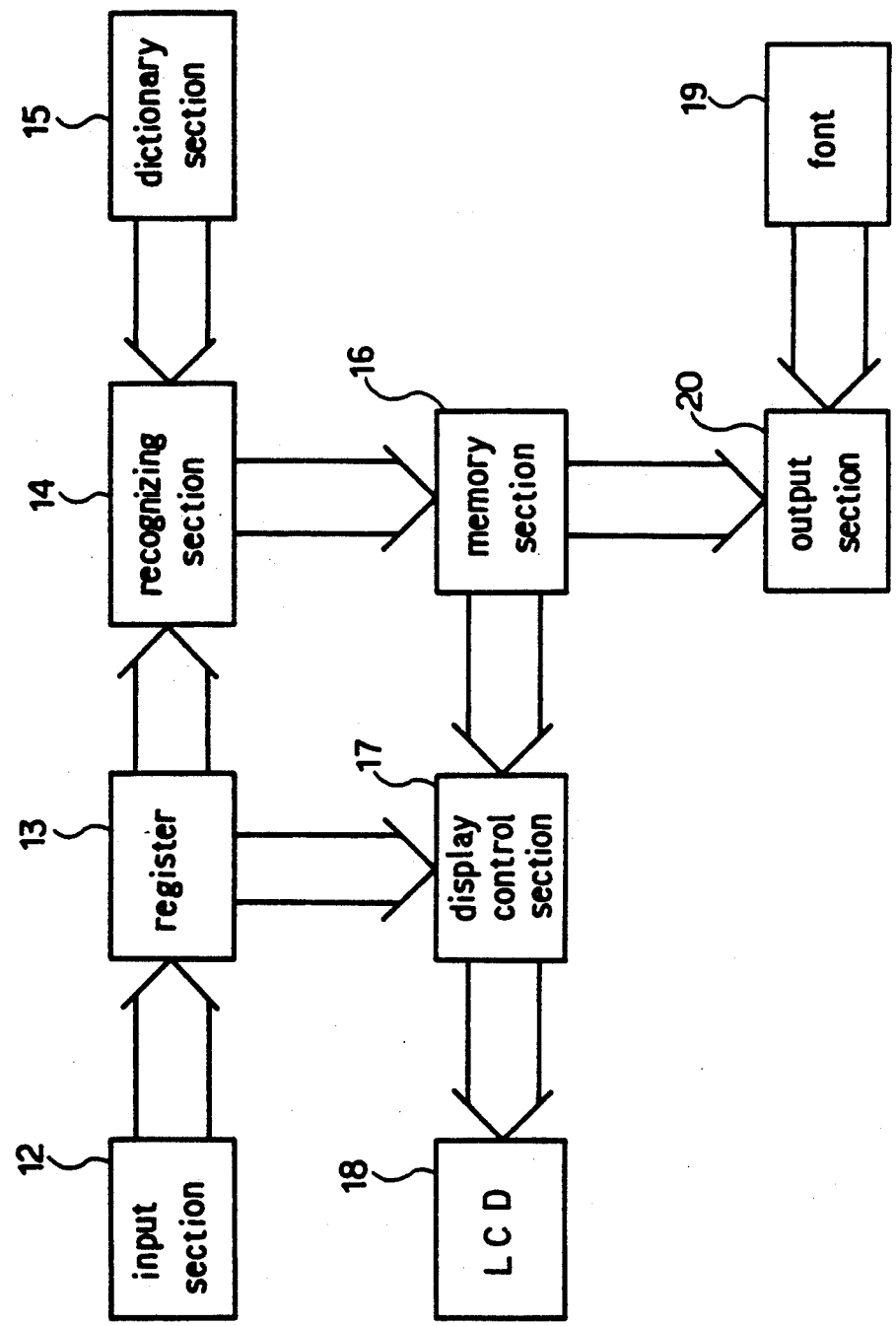
FIG. 2 is a structural block diagram of accessories 6 shown in FIG. 1, FIGS. 3 and 4 are flow charts showing the operation of the CPU provided in the camera.

FIG. 2 is a block diagram of the comment input section in the accessories 6 of FIG. 1.

Comment data inputted from an input section 12 comprising a switch matrix or the like are once stored in a register 13. A recognizing section 14 recognizes letters inputted by means of data in a dictionary section 15. The data of letters recognized by the recognizing section 14 are stored in the memory section 16. A display control section 17 displays data (letters and the like) outputted from the register 13 on the LCD when a comment is written, and also can display the letter data stored in the memory section 16 in order to confirm practically inputted data. Further, fonts are set in a font section 19, and an output section 20 outputs the letters stored in the memory section 16 in a set font as a comment data to CPU 1. In this case, the data are outputted only when the switch S5 for inputting a comment is turned ON.

Figure 3:
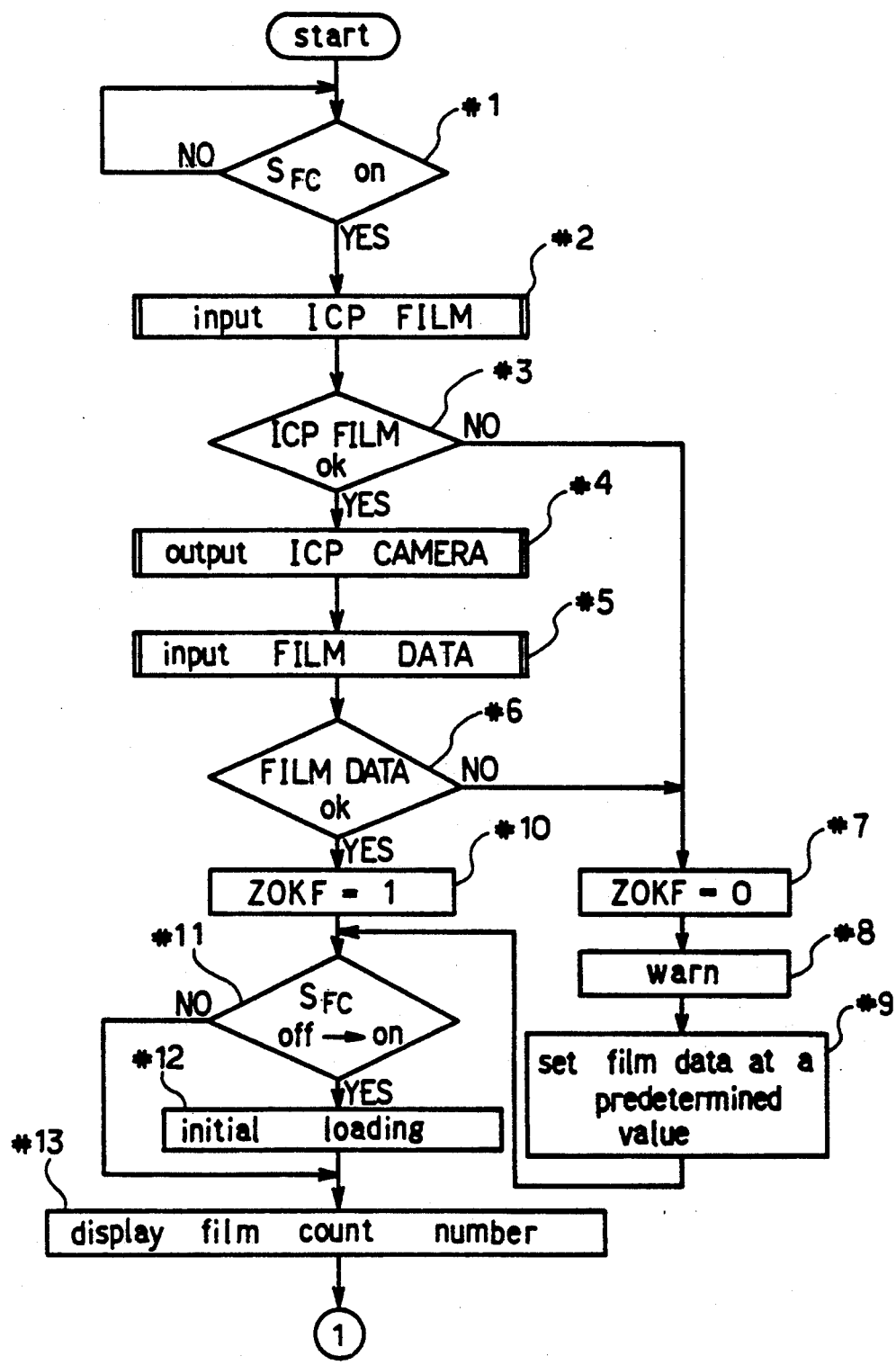

FIG. 3 is a schematic flow chart showing operation of the CPU provided in the camera.

When an electric power is supplied, the CPU 1 begins to operate and waits that a film cartridge is loaded in the camera (#1). When the film cartridge is loaded and the switch $S_{FC}$ is turned ON, the CPU 1 outputs a read signal to the film section 10 and an index (ID) code ICP FILM is inputted from the cartridge side (#2). Then, the inputted code ICP FILM is checked up with an ID code on the camera side (#3). When the film cartridge is fit for the camera (ICP FILM OK), the code ICP CAMERA peculiar to the camera is outputted to the film section 10 (#4). The code ICP CAMERA is checked up on the cartridge side and when it is judged that the camera is fit for the cartridge (ICP CAMERA OK), film data such as film characteristic data, photographing data and the like are outputted (described later in detail), and the CPU 1 inputs these data (#5).

Now, the codes ICP FILM of step #2 and ICP CAMERA of step #4 will be described in the following with reference to FIG. 5. Each type of film has a code ICP FILM different from that of another type of film and a peculiar code ICP CAMERA Ref in its memory.

It is supposed that a cartridge is now loaded and an ICP FILM code "A" is transmitted to the camera side (similarly as it is transmitted to a laboratory instruments). The camera body has all the combinations of ICP FILM codes fit for the camera and ICP CAMERA codes corresponding thereto, and it outputs an ICP CAMERA code "a" corresponding to the ICP FILM code "A" to the cartridge. When the camera body has no code "A" or when a film having no memory IC is loaded in the camera body, the camera gives a warning and permits only film loading with forbidding data reading and writing, or forbids photographing.

The cartridge checks up the code "a" outputted from the camera body with the ICP CAMERA Ref code ("a" in this case), and when they are identical with each other, the memory access is permitted and data communication (described later) is executed. On the other hand, when they are not identical with each other, communication of the photographing data is forbidden similarly to the abovementioned case of the camera body.

Returning now to the flow chart of FIG. 3, the description will be continued.

At step #6, it is judged whether the inputted film data are appropriate or not (for example, whether the film is within the guaranteed effective life term or not). When they are appropriate, the flag ZOKF is set at 1 (#10), and the program advances to step #11. On the other hand, when the cartridge is not fit for the camera (that is, ICP FILM is not OK) at step #3, when the film data are not appropriate (for example, the film is out of the guaranteed effective life term) at step #6, or when it is judged on the cartridge side that the camera is not fit and as a result film data are not outputted from the cartridge, the flag ZOKF is set at 0 (#7), then a warning of impossibility of the data communication is given (#8), the film data is set at a given value (for example, ISO 100)(#9), and the program advances to step #11. In this case, the photographing operation may be forbidden as abovementioned.

Further, it may be executed at step #6 that the number of photographed film frames (the number indicated by a film counter shown in FIG. 16) and data of the number of provided photographing film frames are inputted from the film cartridge, and when they are identical with each other, the photographer is informed of this through a picture display or an alarm, and the following photographing operation is forbidden. Thereby erroneous double photographing on the photographed film can be prevented.

Nextly, it is judged at step #11 whether the switch $S_{FC}$ is turned from OFF to ON or not, or whether the cartridge is replaced by a new one or not. When a new cartridge is loaded, initial loading (initial film winding) is executed (#12), and then the film count number is displayed (#13). When the cartridge is kept unrenewed at step #11, the program skips over step #12, advancing to step #13 in which the film count number is displayed.

Figure 4:
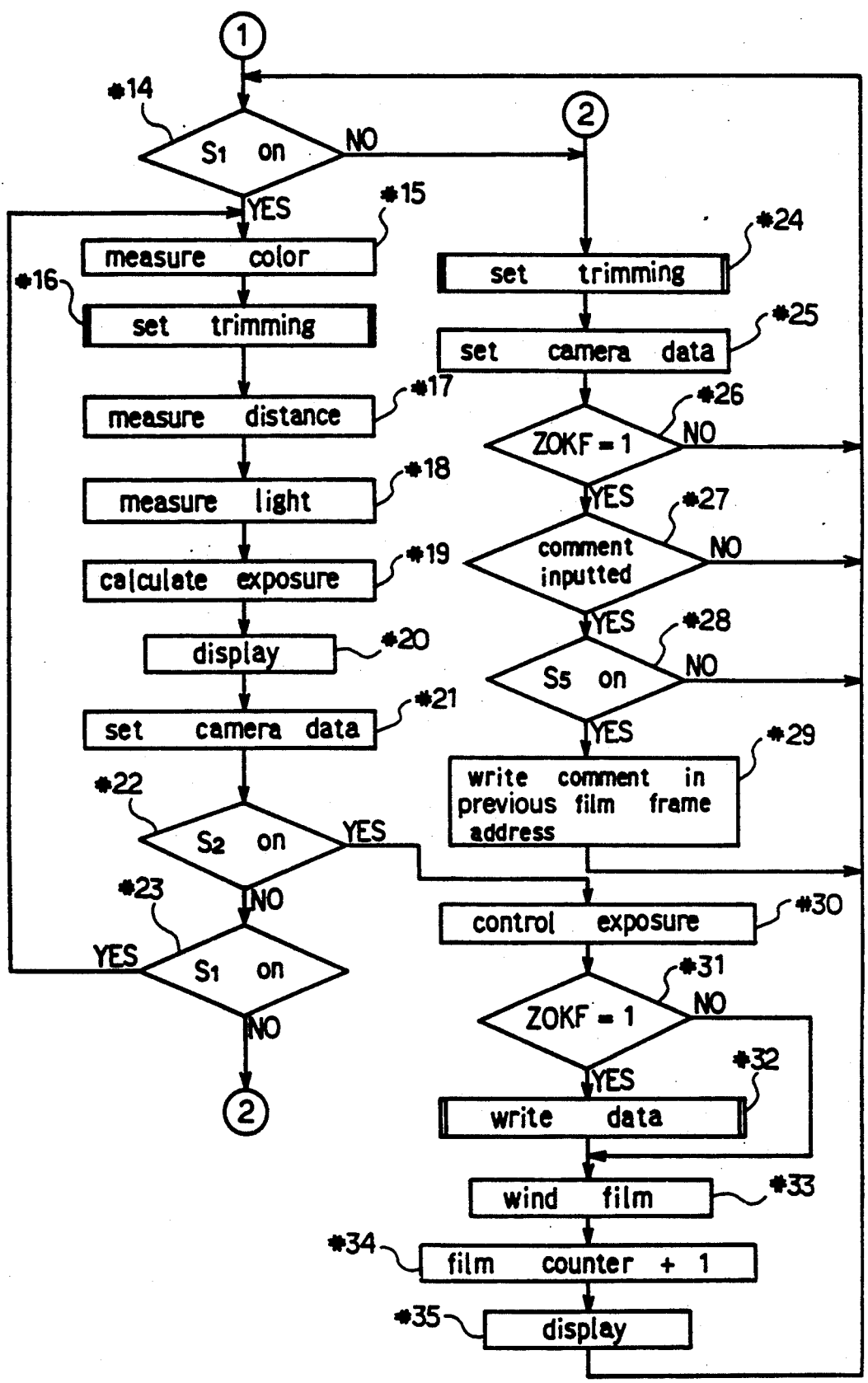

Then, the program advances to step #14 in FIG. 4, in which it is judged whether the switch S1 is in ON state or not. When the switch S1 is in ON state, the color is measured by transmitting a starting signal to the color measuring section 2 (#15). Then, pseudo focal length is set (#16, the way of setting the pseudo focal length will be described later with reference to FIG. 6), and starting signals are transmitted to the distance measuring section 7 and the light metering section 3 thereby executing distance measuring and light metering (#17, #18). Nextly, exposure calculation is executed according to the data obtained (or set) in steps #15 to #18, thereby calculating data required for exposure control such as TV, AV and the like (#19). The calculated value are displayed by the display section (#20). Then the longitudinal or lateral camera attitude, data of accessories and the like are set (#21), and it is judged whether the release switch S2 is in ON state or not (#22). The release switch S2 is not in ON state, it is judged whether the switch S1 is in ON state or not (#23). When the switch S1 is still in ON state, the CPU 1 repeatedly executes a sequence from step #15 to step #21 till the release switch S2 is turned ON or the switch S1 is turned OFF.

When the switch S1 is in OFF state at step #14 or step #23, the program advances to step #24. At step #24, pseudo focal length is set, and then camera data are set similarly to step #21 (#25). Then, it is judged whether ZOKF is 1 or not (#26). When ZOKF is not 1, the program goes to step #14. When ZOKF is 1, it is judged whether the comment input described above with reference to FIG. 2 is executed or not (#27). When the comment input switch S5 is in ON state, the comment is written in the address of the preceding film frame of the memory in the cartridge (#29). Then, the program goes to step #14, and the abovementioned operations are repeated. The reason why the comment is written in the address of the preceding film frame is that generally a comment is practically written after photographing. However, the program may be so set that a comment is written before photographing or written in the address of a desired film frame. When any comment input is not executed, or when comment input is executed but the switch S5 is in OFF state, the program goes to step #14.

On the other hand, the switch S2 is in ON state at step #22, exposure control is executed according to the data obtained at step #19 (#30). Then, it is judged whether ZOKF is 1 or not (#31). When ZOKF is 1, that is, when data communication can be executed, each data is written in the memory in the cartridge (#32), the film is wound up by one frame (#33). When ZOKF is not 1 at step #31, the film is wound up without data writing (#33). At step #32, data for increasing by 1 the count number of a film counter (see FIG. 16) in the memory in the cartridge is also outputted. The way of data writing executed at step #32 will be described later in detail. After step #33, the film counter is increased by 1, and this count number is displayed (#34, #35). Then the program goes to step #14 and the abovementioned sequence is repeatedly executed.

Now, the abovementioned pseudo focal length setting (#16, #24) will be described with reference to the flow chart of FIG. 6(a).

Firstly, it is judged whether ZOKF is 1 or not (#40). When ZOKF is not 1, the switch S3 or S4 for setting pseudo focal length is ON state or not (#46). When ZOKF is not 1, data writing and the like cannot be executed, and when either of the switch S3 or the switch S4 is in ON state, a warning is given, then the program returning (#47). When neither the switch S3 nor the switch S4 is not in ON state, the program returns without giving any warning. When ZOKF is 1 at step #40, it is judged whether pseudo focal length setting is forbidden or not according to pseudo focal length photographing data peculiar to the film included in the film data inputted at the abovementioned step #5 (#41). For example, the film is a positive film for use as a slide film, pseudo focal length setting is forbidden. When pseudo focal length setting is not forbidden, it is judged whether the trimming magnification reaches the limit value or not (#42). Here, "the trimming magnification" indicates a range which is printed at a laboratory, and as it is small, enlarging magnification of printing becomes large, therefore, that is referred to as "trimming magnification is large". When pseudo focal length setting is forbidden or the trimming magnification reaches the limit value, the program goes to step #46. At step #46, it is judged whether the switch S3 or the switch S4 is in ON state or not, and when either of them is in ON state, a warning is given and the program returns. The abovementioned pseudo focal length setting forbidding and the limit value of the trimming magnification are inputted as film data when the film cartridge is loaded. The reason why the trimming magnification is limited is that at a high trimming magnification graininess of a film become outstanding and a picture of only a low quality is obtained. Further, for example, as the ISO sensitivity of a film becomes high, the graininess of the film becomes worse and the grains become more outstanding if trimming is executed at the same magnification.

Further, generally, a monochrome film has a better graininess than a color film has. Therefore, when a monochrome film is used at a high trimming magnification, the graininess of the obtained picture is not so degraded than that of a color film. Accordingly, the limit value of the trimming magnification can be set at a larger value in the case of a monochrome film than in the case of a color film. Further, when two films of the same type and having the same sensitivity with each other are manufactured by different makers respectively, the graininess of them are often different from each other because the makers use different sensitized materials and manufacturing methods respectively, so that the limit values of the trimming magnification of the two films are different from each other.

Figure 7:
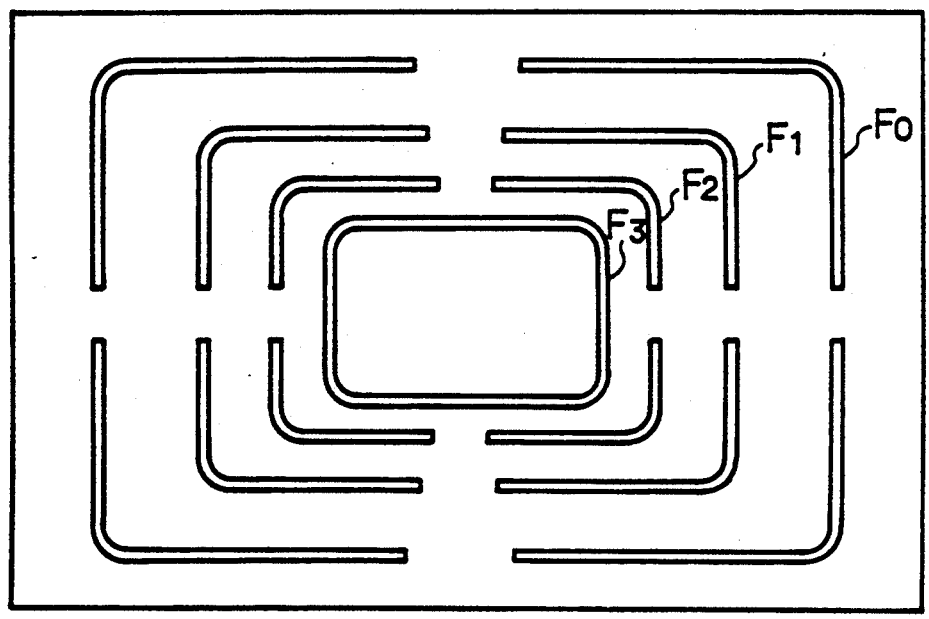
FIG. 7 is a view showing a display in the view field of the finder.

When the trimming magnification does not reach the limit value at step #42, it is judged whether the switch S3 or the switch S4 is in ON state or not (#43). When both of the switches S3, S4 are in OFF state, the trimming magnification is not changed or it is judged that the trimming setting is completed, then the program returning. When either the switch S3 or the switch S4 is ON state, content of a pseudo focal length setting register is changed by one step (#44). It may be so set that the trimming magnification is changed only when the switches S3, S4 are turned from OFF to ON, and if switches S3, S4 are continuously turned ON, the content of the register is changed only by one step. The abovementioned register is a register for storing the present trimming magnification. When the content of the register is changed by one step, the printing range is displayed in the scene of the viewfinder as shown in FIG. 7 (#45), then the program returning to step #42.

In the abovementioned embodiment, when the switch S3 or switch S4 is pressed at the time of pseudo focal length set being forbidden or the trimming magnification reaching the limit value, a warning is given, so that the pseudo focal length cannot be changed. However, it is permitted that, with giving a warning, further pseudo focal length setting can be continuously executed, if a photographer desires the same. Thereby, the range of pseudo focal length setting can be enlarged as desired. Further, even when pseudo focal length setting is forbidden, further setting is permitted to be executed. In this case, the answer of the judgment whether pseudo focal length setting is forbidden or not at step #41 is YES, and a warning is given, then the program advancing to step #42.

Further, even when the trimming magnification once reaches the limit value, the trimming magnification is permitted to be reset on the lower magnification side. This case is the modified embodiment 1 shown in the flow chart of FIG. 6(b). In this case, when pseudo focal length setting is forbidden at step #41, a warning is given, and the program returns. And when the trimming magnification reaches the limit value at step #42, a warning is given and the operation is stopped or it is waited that the trimming magnification is reset on the lower magnification side. However, the trimming magnification cannot be set beyond the limit value.

Furthermore, even when the trimming magnification reaches the limit value, the trimming magnification is permitted to be reset beyond the limit value. This case is the modified embodiment 2 shown in the flow chart of FIG. 6(c). In this case, when pseudo focal length setting is forbidden at step #41, a warning is given and the program returns. And when the trimming magnification reaches the limit value at step #42, a warning is given but the trimming magnification is reset beyond the limit value.

FIG. 7 shows an embodiment of a display by means of a liquid crystal display device (LCD) in the view field of the viewfinder. In this embodiment, the trimming magnification can be set in three steps. In the LCD, four kinds of frames F0, F1, F2 and F3 in correspondence with ranges to be printed are provided so that either one of these frames is selectively displayed according to the content of the pseudo focal length setting register. In the usual photographing mode in which pseudo focal length photographing is not executed, the frame F0 is displayed in the view field of the viewfinder. And every time the switch S3 is turned ON, each of the frames is displayed in the order F0→F1→F2→F3. On the other hand, every time the switch S4 is turned ON, each of the frames is displayed in the order F3→F2→F1→F0. By seeing this display, the photographer can confirm the printing range.

In a state of the frame F3 is displayed, when the switch S3 is turned ON, it may be so set that furthermore change is forbidden, or may be set that each of the frame is displayed in the order F0→F1→F2→F3.

Now, flow charts of inputting ICP FILM data at step #2 and outputting ICP CAMERA data at step #4 will be described with reference to FIGS. 8 and 9.

Firstly, for inputting ICP FILM data, data for designating a reading mode are set in transmission register in the CPU 1 (#60), and the receiving byte number, namely, the byte number of ICP FILM data is also set in the transmission register (#61). Nextly, a circuit selecting signal CS having functions of controlling circuit operation in the cartridge and controlling serial data input and output terminals (SIN,SOUT) is set at High level (#62), so that data input and output can be executed between the transmission register and the cartridge. Then, the designating reading mode data and the receiving byte number set at steps #60 and #61 respectively are outputted according to a serial clock to the cartridge side (#63). When the output is completed, the address of ICP FILM data in the memory in the cartridge is set in the transmission register (#64), and this address is outputted (#65). Then, after waiting for a predetermined time required for treating the cartridge side (described later) (#66), ICP FILM data are inputted according to the serial clock (#67), and the data are stored in a memory in the CPU 1 (#68). Finally, the signal CS is set at Low level (#69), whereby the communication is completed.

For outputting ICP CAMERA data as shown in FIG. 9, firstly data for designating a writing mode are set in the transmission register (#70), and the writing byte number, namely, the byte number of ICP CAMERA data are also set in the transmission register (#71). Then, similarly to the case of inputting ICP FILM data, the CS signal is set at High level so that data input and output can be executed (#72), and the designating reading mode data and the writing byte number are outputted according to the serial clock to the cartridge side (#73). When the output is completed, the address of which ICP CAMERA data is written in the memory in the cartridge is set in the transmission register (#74), and this address is outputted (#75). When the address output is completed, after waiting for a predetermined time required for judging whether it is the reading or writing mode on the cartridge side and judging whether it is the address of the ICP CAMERA data or not (#751), ICP CAMERA data are set in the transmission register (#76), and the data are outputted according to the serial clock (#77). After waiting for a predetermined time required for judging whether the camera is fit for the cartridge (#771), the signal CS is set at Low level (#78), whereby the communication is completed.

Now, operations for reading and writing data will be described with reference to the flow charts of FIGS. 10 and 11.

Firstly, for reading data, namely, inputting FILM DATA, data for designating a reading mode are set in the transmission register in the CPU 1 (#80), and the whole byte number of the data desired to be read are also set in the transmission register (#81). Then, the CS signal is set at High level so that data input and output can be executed (#82), and the data set in the transmission register at steps #80 and #81 are outputted to the cartridge side according to the serial clock (#83). When the output of the designating reading mode data and the input byte number is completed, the head address of the memory in the cartridge in which the input data are to be stored is set at the transmission register (#84) and the head address is outputted (#85). After waiting for a predetermined time required for treating the cartridge side (#86), data corresponding to the outputted address are inputted according to the serial clock (#87). The inputted data are stored in the corresponding address in the memory in the CPU 1 (#88). Then, it is judged whether the whole data are inputted or not (#89). When the whole data are not inputted yet, the program returns to step #86 and the following data are inputted till whole data are inputted. When the whole data are inputted, the CS signal is set at Low level (#90), the communication is completed.

Now, operations for writing data will be described. Firstly, designating writing mode data and the whole byte number of the data to be written are set in the transmission register (#91, #92). Nextly, the signal CS is set at High level (#93), and the data set in the transmission register at steps #91, #92 are outputted to the cartridge side (#94). When the data output is completed, the head address of the memory in the cartridge in which the data are to be written is set in the transmission register (#95) and this address is outputted (#96). When the address output is completed, after waiting for a predetermined time required for judging whether it is the reading or writing mode and whether the data are data relating to photographing (namely, data other than ICP CAMERA data) or not (#961), the writing data are set in the transmission register (#97) and the data are outputted according to the serial clock (#98). Then, it is judged whether the whole data are outputted or not (#99). When the whole data are not outputted yet, the program returns to step #86 and the following data are outputted till whole data are outputted. When whole data are outputted, the CS signal is set at Low level (#100), and the communication is completed.

Figure 10:
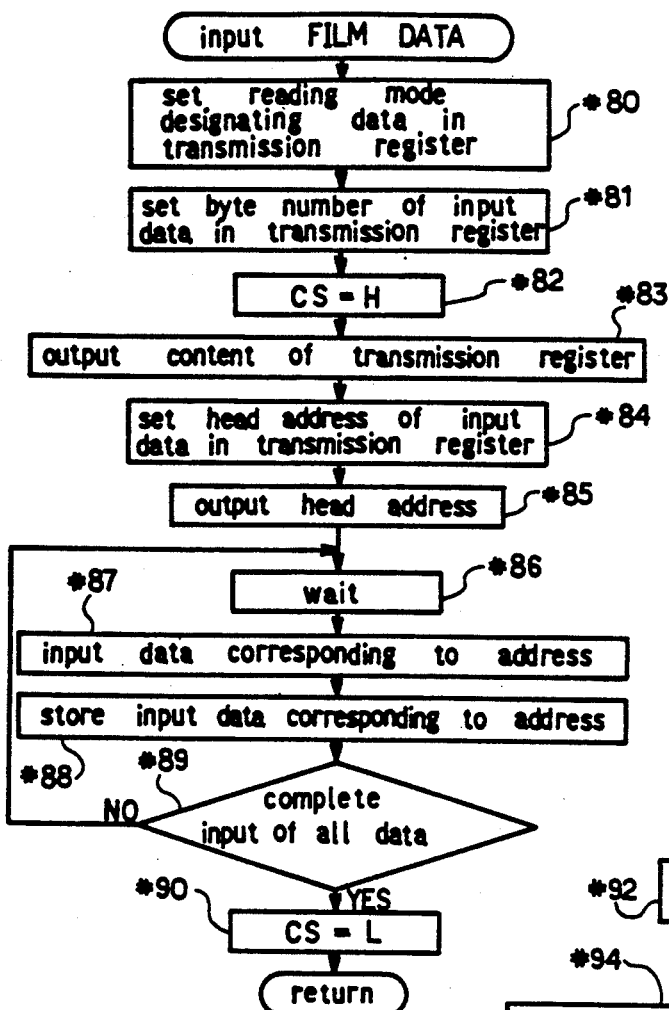
FIG. 10 is a flow chart showing the FILM DATA inputting operation.
Figure 11:
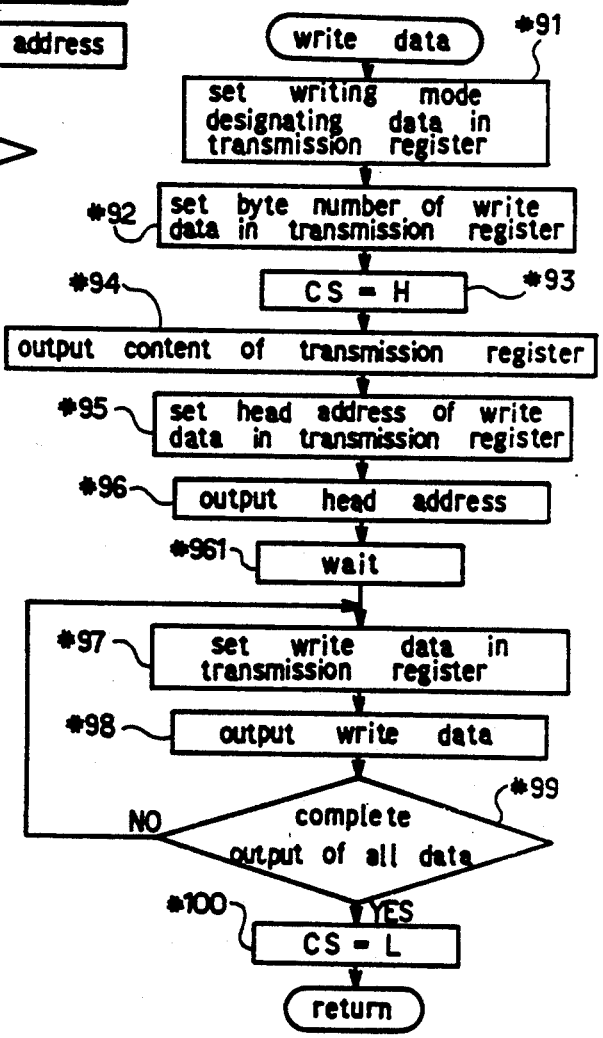
FIG. 11 is a flow chart showing the data writing operation.

In FIGS. 10 and 11, head address is designated in the data address designation (sequential access). However, the address in which data are read or written may be designated at optional times before inputting or outputting the data (random access).

The operations on the camera side are described in the above, and now structure and operations of the first embodiment on the cartridge side will be described in the following.

Figure 12:
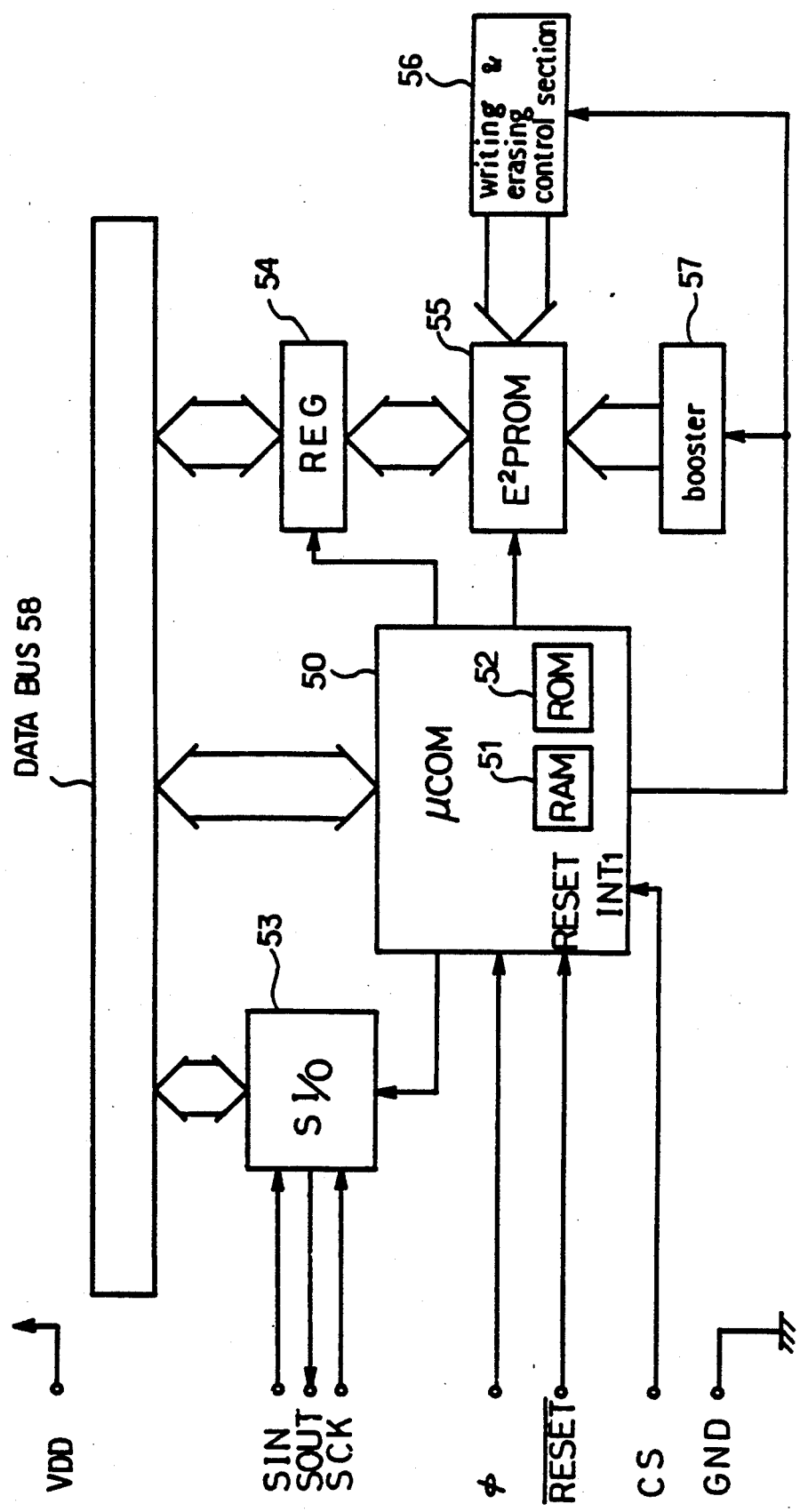
FIG. 12 is a structural block diagram of the first embodiment of a film cartridge of the present invention.

FIG. 12 is a block diagram showing the structure of the cartridge side. There are provided eight terminals used for communicating with a camera and for an electric source. $V_{DD}$ and GND are terminals for the electric source. $\phi$ is a terminal for inputting a system clock $\phi$ for operating a circuit in the cartridge from the oscillating section 11. $\overline{RESET}$ is a terminal for resetting a microcomputer (hereinafter referred to only as μCOM) 50 for controlling each block of the cartridge, and a RESET signal is inputted when the cartridge is loaded in the camera and the electric source of the camera is turned on. CS is a terminal for inputting the abovementioned CS signal for controlling data input and output from the camera. SIN, SOUT and SCK are terminals used for serial communication, and a serial data input signal, a serial data output signal and a serial clock are given to SIN, SOUT and SCK respectively. By way of lines of these three terminals, data communication between the cartridge and the camera is executed.

The μCOM 50 has memories for a RAM region 51 and a ROM region 52 thereinside, an interruption (INT1) occurs when the CS signal from the camera becomes "H", so that the μCOM 50 starts the operation for communicating data.

Numeral 53 indicates an interface for controlling each of signals of SIN, SOUT and SCK, and controls data input and output according to a signal from μCOM 50.

Numeral 54 indicates a register for temporarily storing data therein. When data are written in a E²PROM 55, the data to be written are once stored in the register 54, and then the stored data are written in the E²PROM 55 according to a signal from the μCOM 50 at the timing when CS reverses from "H" to "L". Further, when data are read, the data to be read are once stored in the register 54 and then the stored data are outputted according to a SCK signal through the interface 53 to the camera.

Further, a control section 56 for controlling data writing and deleting controls data writing and deleting in the E²PROM 55. A boosting section 57 generates a high voltage to be applied to the E²PROM 55. The control section 56 and the boosting section 57 are operated according to control signals from μCOM 50. Further, the μCOM 50, the interface 53 and the register 54 are connected with one another by means of a data bus 58, and the mutual data communication therebetween are executed through the data bus 58.

Now, operations of μCOM 50 will be described in the following with reference to FIGS. 13, 14 and 15. When the film cartridge is loaded in the camera and the electric source of the camera is turned on, the operations of RESET shown in the flow chart of FIG. 13 are executed. Firstly, resetting operations of a usual microcomputer are executed and ICP CAMERA is reset (#110). Then, the interruption INT1 according to the CS signal from the camera is permitted (#111), and it is waited that the CS signal becomes "High" (that is, the interruption INT1 is executed). When the CS signal becomes "H", the program goes to the INT1 routine shown in FIG. 14.

In the INT1 routine shown in FIG. 14, an interruption of the INT1 is forbidden (#120), and an operation code is inputted (#121). This operation code indicates the data showing the reading mode or the writing mode and the whole byte number of the data to be communicated (see #60, #61, #70, #71, #80, #81, #91 and #92). Then, the head address of the data is inputted (#122). Thereafter, it is judged whether it is a reading mode or not according to the operation code inputted at step #121 (#123). When it is a reading mode, the program goes to the READ routine. And when it is not a reading mode, that is, when it is a writing mode, the program goes to the WRITE routine shown in FIG. 15.

In the READ routine, it is judged whether the inputted address is an address of ICP FILM data or not (#124). When it is an address of ICP FILM data, the ICP FILM data stored in the ROM 52 are outputted (#125). Then, after waiting that the CS signal becomes "L" (the communication is completed) (#130), an interruption of the INT1 is permitted (#131), and it is waited that an interruption of INT1 is executed again.

When the inputted address is not an address of ICP FILM data at step #124, the data are data relating to photographing the data corresponding to the address are transmitted from the E²PROM 55 to the register 54 (#126), and the data are outputted (#127). Then it is judged whether the whole data to be communicated (the whole data from the camera) are outputted or not (#128). When the whole data are not outputted yet, the address in the E²PROM 55 is increased by 1 (#129), then the program returning to step #126, and the routine from steps #126 to #129 are repeated till the whole data are outputted. When the whole data are outputted, the program goes to step #130. After waiting that the CS signal becomes "L", an interruption of the INT1 is permitted (#131), and it is waited that an interruption of the INT1 is executed again.

Figure 15:
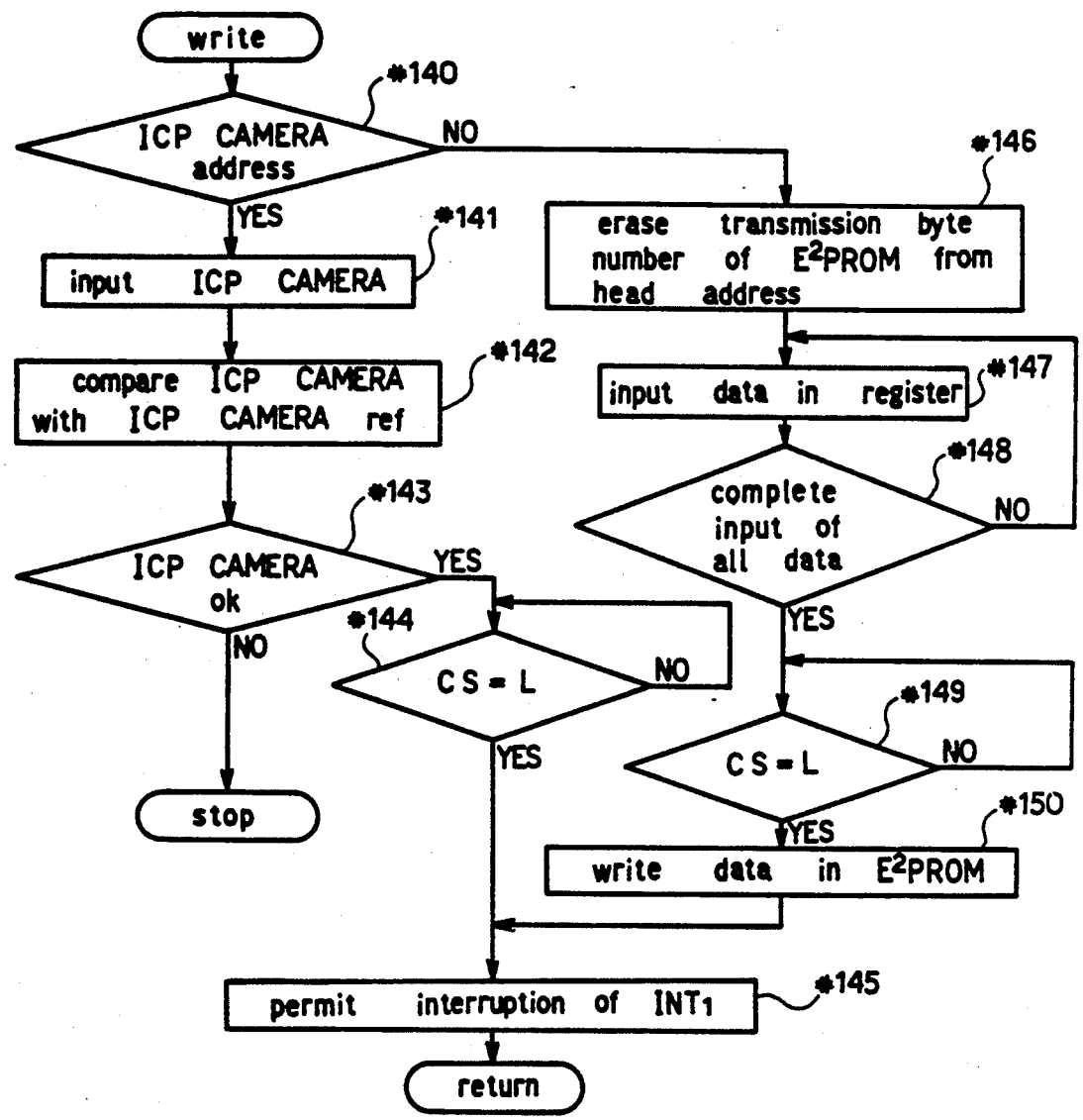
FIG. 15 is a flow chart showing the WRITE routine.

When it is a writing mode at step #123, the program goes to the WRITE routine shown in FIG. 15. Firstly, it is judged whether the address inputted at step #122 is an address of ICP CAMERA data or not (#140). When it is an address of ICP CAMERA data, ICP CAMERA data are inputted from the camera side (#141), and then the inputted ICP CAMERA data are compared with ICP CAMERA Ref data peculiar to each film cartridge (#142, #143). When the ICP CAMERA data and the ICP CAMERA Ref data are not identical in this comparison, the operation of the μCOM 50 is stopped, so that erroneous data reading and writing, erroneous operation and the like can be prevented. When the ICP CAMERA data and the ICP CAMERA Ref data are identical with each other, after waiting that the CS signal becomes "L" (#144), an interruption of the INT1 is permitted and it is waited that an interruption of the INT1 is executed again.

On the other hand, at step #140, when the address inputted at step #122 is not an address of ICP CAMERA data, the byte number inputted at step #121 of the data of E²PROM 55 are deleted from the address inputted at step #122 by means of the writing and deleting control section 56 (#146). After the deletion is completed, the inputted data are once stored in the register (#147), and the data are continuously stored in the register 54 till the whole data are completely inputted (#148). The register 54 is so constructed as to have a capacity capable of storing therein the whole data relating to one film frame photographing. When the whole data are inputted, after waiting that the CS signal becomes "L" (the communication is completed) (#149), the data stored in the register 54 are written in the E²PROM 55 (#150). Then, an interruption of the INT1 is permitted (#145), and it is waited that an interruption of the INT1 is executed again.

FIG. 16 shows the relation between the address of E²PROM 55 in the memory in the cartridge and data to be stored therein.

An address indicated by the upper two bits is obtained by the lower two bits of the abovementioned operation code. Further, the lower address are represented by sexadecimal system for simplification of the drawing. In correspondence with each film frame from the first frame of the film, a plurality of data are stored in a predetermined order, namely, the photographing year, month and data, the trimming magnification and others. Further, the data stored in and below 8OH are mainly data used in photo processing shops and laboratories and data ICP FILM, ICP CAMERA Ref relating to the film characferistic. In the abovementioned manner, the whole data are stored in the predetermined addresses.

Now, the second embodiment of a circuit in the film cartridge will be described in the following with reference to FIG. 17.

The cartridge has five terminals which are terminals connecting the cartridge with the camera. Terminals $V_{DD}$, SCK, CS and GND are the same with those of the abovementioned first embodiment. A terminal S IN/-OUT is constituted by integrating the serial input terminal and the serial output terminal shown in FIG. 12, and the input and output of the S IN/OUT terminal is changed over by analogue switches 113, 114.

Data inputted through the S IN/OUT terminal are stored, for example, one byte at a time in a shift register 100 and latched in an operation code latch section 103, an address latch section 104 and a data register 105 respectively. The timing of the latching operation is decided by a counter 101 and a decoder 102. Among the data latched in the operation code latch section 103, data for designating reading, writing and erasing mode are inputted in a decoder 109, the byte number data being inputted in a comparator 106 and the address data being inputted in a counter 108. Then, designating data from the decoder 109 are given to an E²PROM 111. Further, control signals WRITE, ERASE, READ are outputted to the decoder 102, an erasing section 110 for erasing data stored in the E²PROM 111, and a reading control section 112 for reading data, respectively.

A counter 107 counts clock pulses issued from a terminal AN4 of the decoder 102. The comparator 106 compares the counter value of the counter 107 with the whole byte numbers of the transmitted and received data, and when they are identical with each other, the comparator outputs a Low level signal COMP to the counter 101. Data in the designated address in the E²PROM 111 are erased or written according to address data outputted from the counter 108, writing data outputted from the data register 105 and erasing data outputted from the erasing section 110.

Sections of the cartridge having the abovementioned structure will be described in detail in the following.

Figure 18:
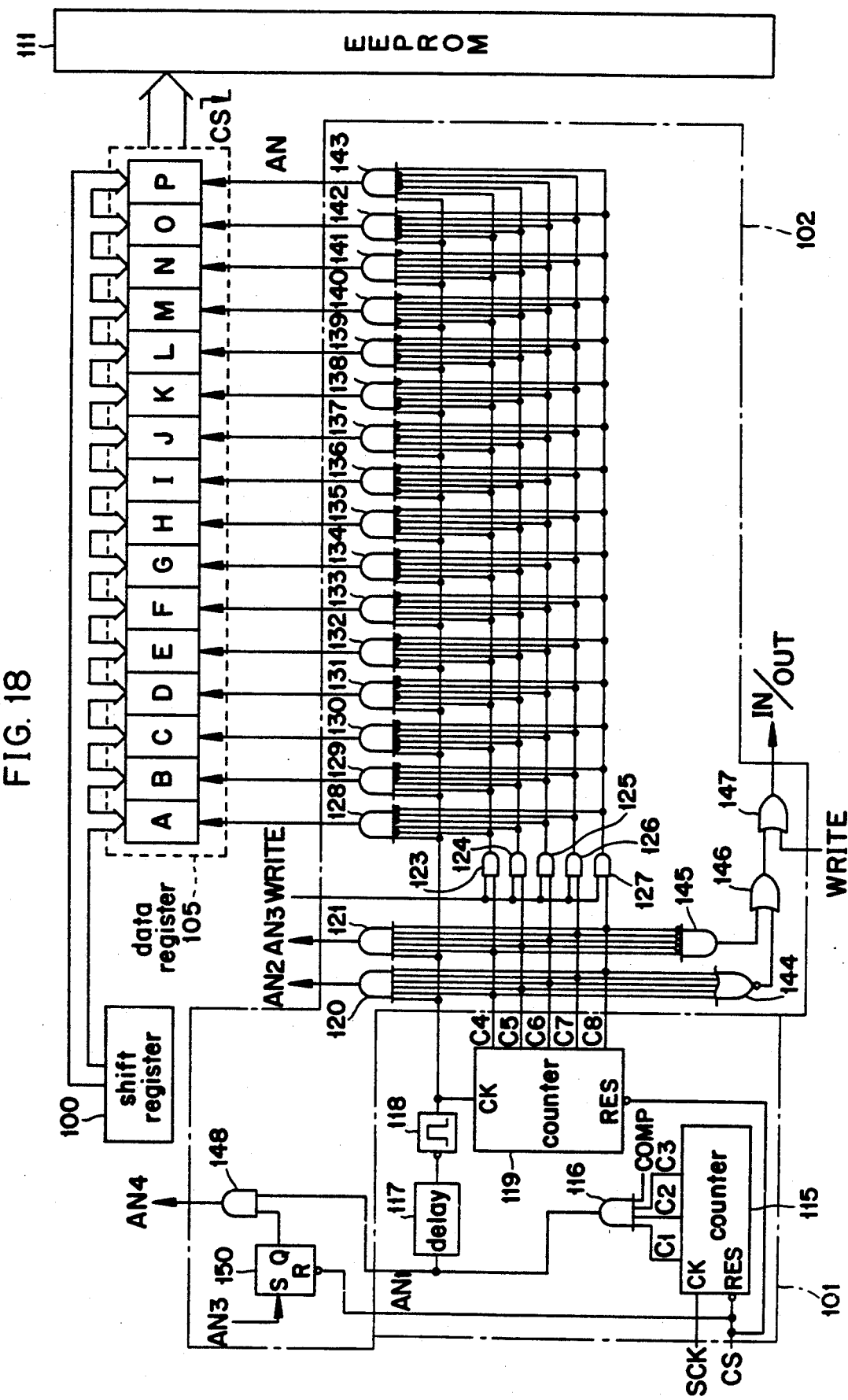
FIG. 18 is a detailed structural diagram of the decoder 102 and others shown in FIG. 17.

FIG. 18 shows structures of the counter 101, the decoder 102 and the data register 105 in detail.

In FIG. 18, when the CS signal outputted from the camera turns from "L" to "H", the reset states of a counter 115, a counter 119 and a flip-flop 150 are released. Then, a serial clock SCK from the camera is inputted in a clock terminal CK of the counter 115, and the counter 115 counts the serial clock pulses. Binary outputs C1, C2 and C3 are inputted in an AND circuit 116, and when the output COMP from the comparator 106 is at "High" level, a High level signal is outputted for every bite from the AND circuit 116 (AN1). The output AN1 from the AND circuit 116 is inputted in a delay circuit 117 and also in one terminal of an AND circuit 148 in the decoder 102. The output delayed for a predetermined time by the delay circuit 117 is reversed to be inputted in a one-shot circuit 118. An output of the one-shot circuit 118 is inputted in a clock terminal CK of a counter 119 and also in one input terminal of each of AND circuits 120, 121, 128 to 143.

The counter 119 counts the output from the one-shot circuit 118, and according to the count value, it outputs binary signals from terminals C4, C5, C6, C7 and C8. Outputs from the terminals C4 to C8 are inputted in the AND circuit 120, 121 and also inputted through AND circuits 123 to 127 into AND circuits 128 to 143 and further into an AND circuit 145 and a NOR circuit 144. In the other input terminals of the AND circuit 123 to 127 respectively, WRITE signals from the decoder 109 are inputted. It means that only in data writing mode (WRITE="H"), AND circuits 123 to 127 are in the active state and outputs of the output terminals C4 to C8 are inputted in the AND circuits 128 to 143.

Table 1 shown later shows the relation between the outputs of the AND circuits 120, 121 and the AND circuits 128 to 143 in the data writing mode and the outputs C4 to C8. From Table 1, when the outputs of the AND circuits 128 to 143 are turned from "L" to "H", data outputted from the shift register 100 are inputted in the corresponding registers A to P in the data register 105.

Further, the outputs of the NOR circuit 144 and the AND circuit 145 respectively are inputted in an OR circuit 146, and the output of the OR circuit 146 is inputted in an input terminal of an OR circuit 147. In the other input terminal of the OR circuit 147, a WRITE signal is inputted. An output signal IN/OUT of the OR circuit 147 is a signal for controlling analogue switches 113, 114. In other words, when the signal IN/OUT is "H", the analogue switch 113 is conductive and the analogue switch 114 is nonconductive, so that data from the camera are inputted in the shift register 100. And when the signal IN/OUT is "L", the analogue switch 113 is nonconductive and the analogue switch 114 is conductive, so that data from the cartridge are outputted to the camera. Further, the output AN3 of the AND circuit 121 is inputted in a set terminal of the flip-flop 150.

In the abovementioned structure, operations of data communication with the camera will be described in the following. At the beginning of the data communication, the CS signal becomes "H" and the counter 115 starts counting the serial clock SCK. At this time, the output COMP of the comparator 106 is "H". According to the clock SCK, an operation code from the camera is inputted in the shift register 100. When the operation code (1 byte) is completely inputted, the output of the AND circuit 116 becomes "H", and pulses are outputted from the one-shot circuit 118. Since the counter 119 is reset till the CS signal becomes "H", the outputs C4 to C8 thereof are all "L". Accordingly, an operation code latch timing signal AN2 is outputted from the AND circuit 120. According to this signal AN2, data of the shift register 100 are inputted in the operation code latch section 103. When the output of the one-shot circuit 118 becomes "L", the output C4 of the counter 119 becomes "H". Then, when data of the second byte (address data) are inputted in the shift register 100, pulses are outputted from the one-shot circuit 118 similarly to the case of the data of the first byte. At this time, since only C4 of the outputs of the counter 119 is "H", the address latch timing signal AN3 is outputted from the AND circuit 121, so that the address data in the shift register 100 are outputted to the address latch section 104.

Figure 17:
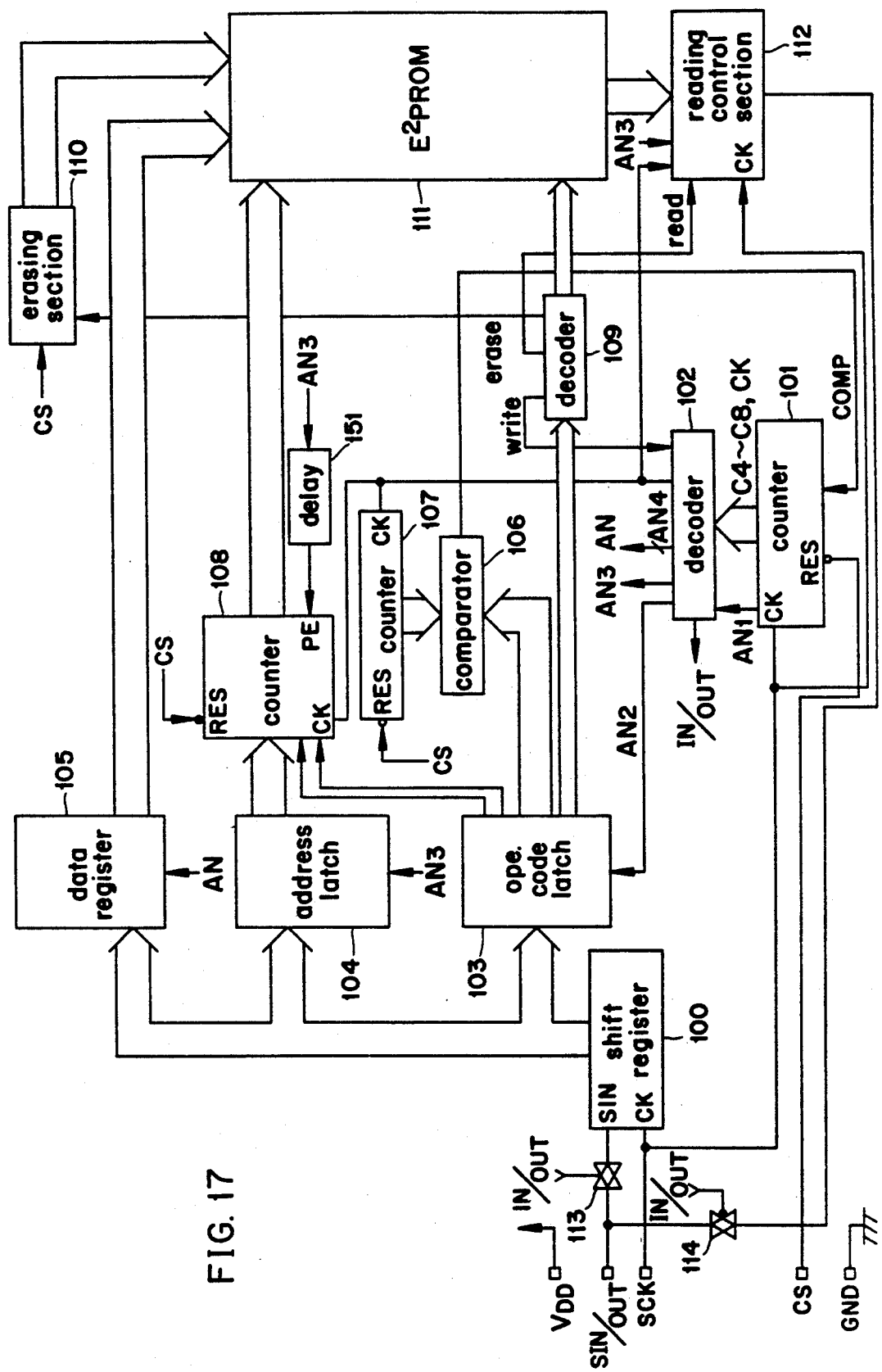
FIG. 17 is a structural block diagram of the second embodiment of a film cartridge of the present invention.

When the operation code is latched, the decoder 109 shown in FIG. 17 makes the output READ to be "H" in the case of reading, makes the output WRITE to be "H" in the case of writing and the output ERASE to be "H" in the case of erasing. Accordingly, only in the case of writing, the input data are transferred to the data register 105 according to the timing signals of the AND circuits 128 to 143. Then, when the CS signal becomes "L", in response to this, the content of the data register 105 is written in the predetermined address in the E²PROM 111.

Data reading and erasing operations will be described later in detail.

Further, as for the beginning two bytes of data, the signal IN/OUT is always made to be "H" by means of the NOR circuit 144, the AND circuit 145 and the OR circuit 146, 147, whereby the writing (input) mode is set. And thereafter when the signal WRITE is "H", the signal IN/OUT is kept to be "H", that is, the writing mode is kept. When the signal WRITE is "L", the signal IN/OUT turns to "L" and the reading (output) mode is set.

Now, the relation between the address designation and the byte number will be described in the following with reference to FIGS. 17 and 18. Among the operation codes latched by the operation code latch timing signal AN2, the byte number of the communicated data are inputted in the comparator 106. On the other hand, the address data latched by the address latch timing signal AN3 and the address data among the previously latched operation codes are inputted in a preset input terminal of the counter 108. At this time, the signal AN3 is inputted in a set terminal of the flip-flop 150. Therefore, after the two byte data communication is completed, output Q of the flip-flop 150 always becomes "H", and the AND circuit 148 is in the active state. Every time one byte data communication is completed, the signal AN1 becomes "H" and the output AN4 of the AND circuit 148 becomes "H". And the counters 107, 108 count the output AN4 of the AND circuit 148.

On the other hand, the signal AN3 indicating that the beginning two byte data communication is completed is also inputted in a delay circuit 151, and therefore it is delayed a predetermined time in being inputted in a preset enable terminal PE of the counter 108. Thereby the previously latched address is inputted in $E^2PROM$ 111. Thereafter, every time one byte data communication is completed, the counter 108 increases the address by 1. During this time, the counter 107 outputs the byte number of the transmitted and received data to the comparator 106, and when the byte number latched at the beginning (namely, the whole byte number of the data to be transmitted and received) becomes identical with the present number, the signal COMP becomes "L". This signal COMP is an input of the AND circuit 116 shown in FIG. 18. Therefore, when the necessary byte number of data are completely communicated, the AND circuit 116 becomes nonconductive, and the counters 107, 108 stop the counting operation. Further, the counters 107, 108 are reset when the CS signal becomes "L".

When data have been already written in a memory region of $E^2PROM$ 111 in which new data are to be written (that is, when data are communicated), the data written in the region are erased immediately before writing the new data. The operation of erasing the data will be described below.

As abovementioned, at the time of data writing, the designated byte number of data are written in order from the designated head address.

Figure 19:
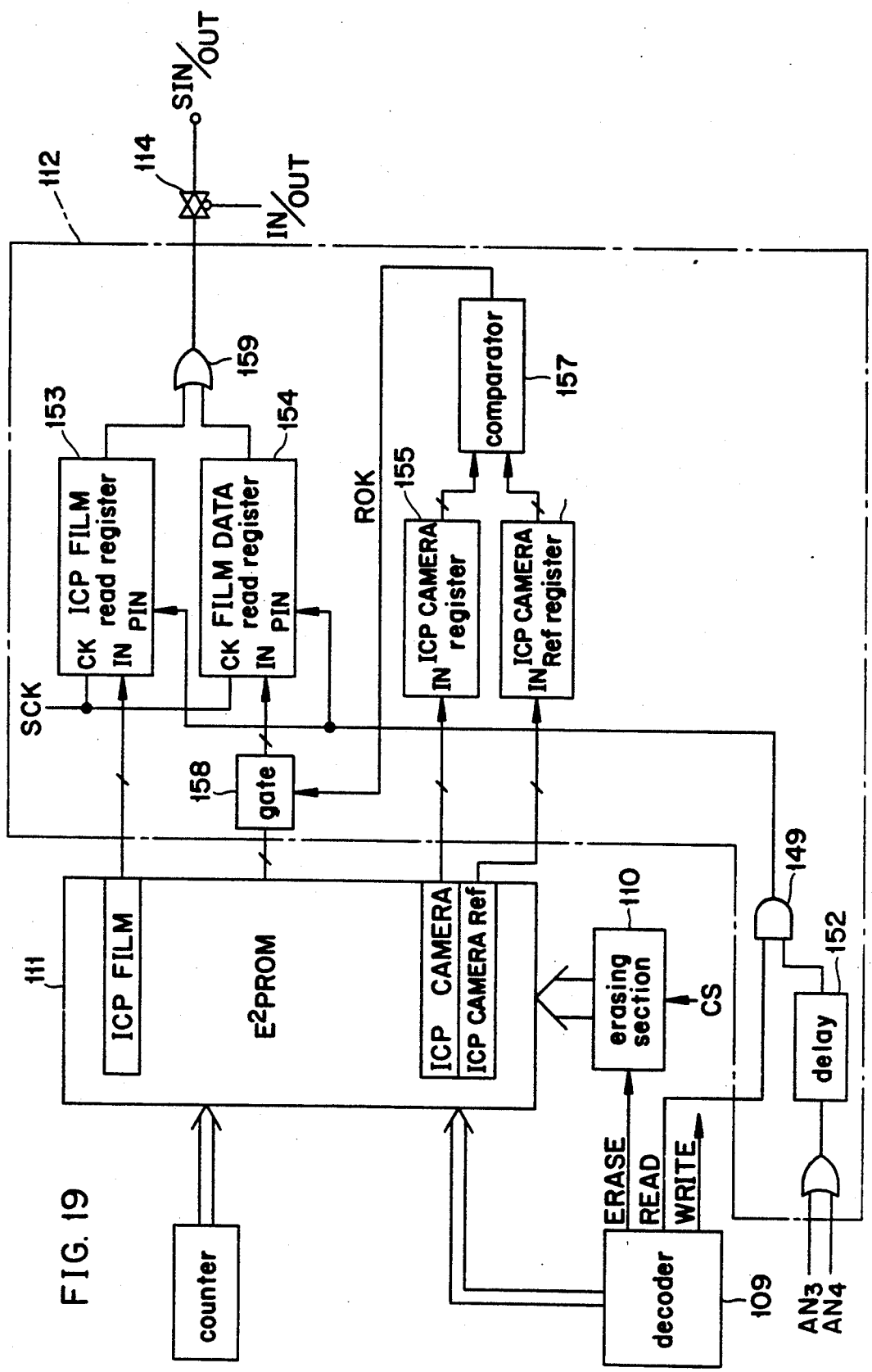
FIG. 19 is a structural diagram of the reading control section 112.

FIG. 19 shows structure of the read control section 112 and the like. Now, the read and erase control operations will be described in the following.

Erasing operation includes two cases. One is a case of erasing all the stored data, and the other is a case of erasing old data before writing new data. In the case of erasing all the stored data, data designating to erase all the data are set in the operation code. As a result, a signal ERASE is outputted from the decoder 109 to operate an erasing section 110, whereby all the data in $E^2PROM$ 111 are erased. This data erasing operation is executed at the timing when the CS signal reverses from "H" to "L". On the other hand, in the case of writing new data, firstly data designating to erase a part of the data is set in the operation code, and the address in which new data are written and the byte number of the new data are designated. Then, when the CS signal becomes "L", the designated byte number of data are erased from the designated address. Thereafter, the new data are written in the abovementioned manner.

Now, the read control operation will be described in the following. When the data designating the reading mode and the address of the ICP FILM data are inputted, the ICP FILM data stored in the $E^2PROM$ 111 are transferred to a register 153 for reading the ICP film data. A trigger terminal PIN of the register 153 is connected through an AND circuit 149, a delay circuit 159 and an OR circuit to the output terminals of AND circuits 121, 148. The register 153 inputs the transferred ICP FILM data one byte at a time a predetermined time after the output AN3 of the AND circuit 121 or the output AN4 of the AND circuit 148 becomes "H". When the ICP FILM data are inputted in the register 153, the ICP FILM data are outputted from a S IN/OUT terminal according to a clock SCK. During this time, the output from a FILM DATA reading register 154 is always kept to be "L". Further, the control signal IN/OUT for controlling the analogue switch 114 is "L" and therefore the analogue switch 114 is conductive.

When ICP CAMERA data are written in the $E^2PROM$ 111, the written ICP CAMERA data and ICP CAMERA Ref data stored in the $E^2PROM$ 111 are transferred to their respective registers 155, 156, and it is judged whether these data are identical with ICP CAMERA data written in a comparator 157. When they are identical, a signal ROK is made to be "H" so that the data can be read. The signal ROK is inputted in a gate 158. When they are not identical, the signal ROK is made to be "L" so as to forbid to read the data. When the gate 158 is enable, the first data are inputted in a register 154 in response to the address latch timing signal AN3, and are outputted according to the clock SCK, similarly to the case of outputting ICP FILM. In this case, the data are inputted in the register 154 at a timing a predetermined time after the signal AN3 becomes "H", by means of the delay circuit 152. When the output of the first data is completed, the next data are inputted in the register 154 in response to the signal AN4 indicating completion of one byte data output. In this manner, data are continued to be outputted till the necessary data are completely outputted, or the CS signal becomes "L".

The address designation in the data reading is executed in the same manner as is executed in the data writing. Further, in the data writing, data stored in the address registered by the counter 108 are similarly transferred to the registers 153, 154. However, in this case, the READ signal is "L", the output of the AND circuit 149 does not become "H", so that the data are not taken in the registers 153, 154.

Figure 20:
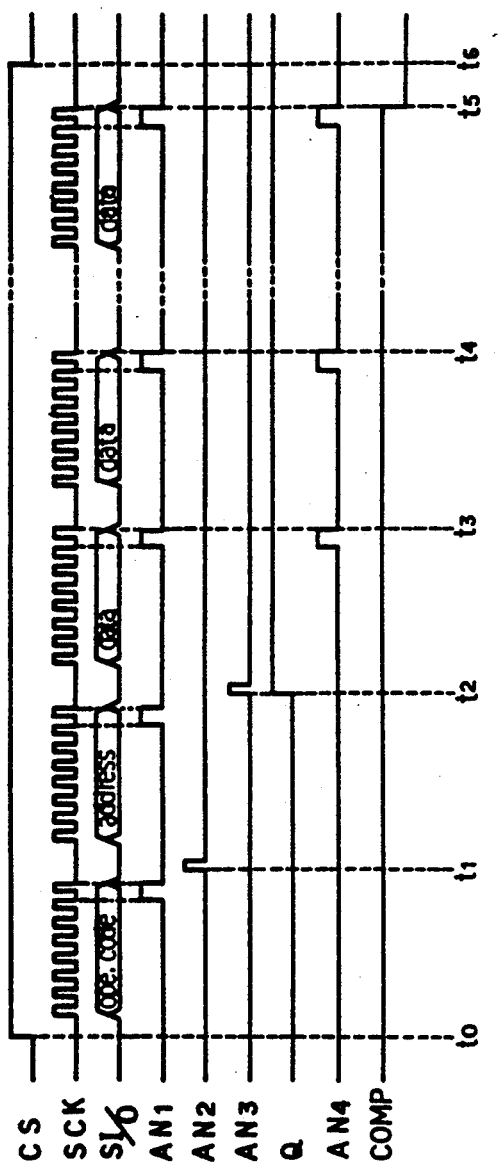
FIGS. 20 and 21 are timing charts of the data communication.
Figure 21:
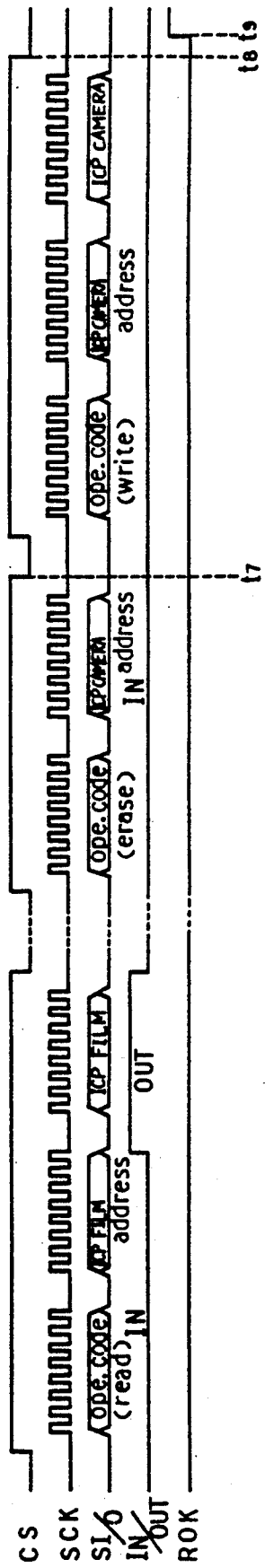

FIGS. 20 and 21 show the timing charts of the abovementioned data communication.

FIG. 20 shows the timing of usual data communication. When the CS signal becomes "H" (t0), the data communication is started. The clock SCK is inputted, and according to the clock SCK, the operation code (the reading, writing or erasing mode and the byte number of the data to be communicated) is inputted from S I/O according to the clock SCK. As shown in the figure, the clock SCK is, after eight continuous pulses, in the state of "L" level for a predetermined time. When the input of the operation code is completed (t1), the signal AN2 becomes "H", and thereby the operation code is latched. Then, the address of the data is inputted according to the clock SCK. When the input of the address is completed (t2), the signal AN3 becomes "H", and thereby the address is latched to the address latch section. The input of the operation code and the address is completed, the data communication is executed. At the time of latching the operation code, the mode is judged. When it is the reading mode, the data are outputted, and when it is the writing mode, the data are inputted. And when the erasing mode, data in all or a designated part of the memory regions of the $E^2PROM$ are erased. When the first byte of the data are inputted or outputted, the counters 107, 108 make the abovementioned operation according to the signal AN4 (t3).

When the second byte of the data are communicated (t4), the same operation is executed.

The data are communicated in the abovementioned manner and when the whole of the necessary data are completely communicated, the signal COMP from the comparator 106 turns from "H" to "L" (t5). Thereby, the signal AN4 is kept to be "L", and the counters 107, 108 stop the counting operation. Then, when the CS signal becomes "L" (t6), the data communication is ended. In the writing mode, the data from the register 105 are written in the E²PROM 111 at the timing t6.

FIG. 21 shows a timing chart of the communication of the ICP FILM data and the ICP CAMERA data, in which the latch timings and the like are the same with those of FIG. 20. Firstly, an operation code is inputted. In the operation code, the reading mode in which the camera reads the ICP FILM data and the byte number of the ICP FILM (1 byte in FIG. 21, but it may be a plurality of bytes) have been set. When the input of the operation code is completed, address of ICP FILM data is inputted. Completing of the address input, the signal IN/OUT is changed over from "L" to "H", and the ICP FILM data are outputted from the cartridge to the camera according to the clock SCK. When the output of the ICP FILM data is completed, the CS signal from the camera becomes "L" and the data communication is ended.

Then, the camera receives the ICP FILM data and judged whether the cartridge is fit for the camera or not. When the cartridge is fit for the camera, the camera outputs the ICP CAMERA data, but before outputting the ICP CAMERA data, the camera sets the erasing mode for erasing old ICP CAMERA data stored in the memory in the cartridge, and then outputs the address of the ICP CAMERA data (1 byte in FIG. 21). When the address of the ICP CAMERA data are completely outputted, the CS signal is turned to "L" (t7). When the CS signal becomes "L", the previously stored ICP CAMERA data are erased by the erasing section 110. When the old ICP CAMERA data are completely erased, the camera outputs new ICP CAMERA data, that is, the ICP CAMERA data corresponding to the ICP FILM data inputted from the cartridge loaded in the camera. In other words, the writing mode and the byte number (1 byte in FIG. 21) of the ICP CAMERA data are set in the operation code and the operation code is outputted, and thereafter, the address of the ICP CAMERA data is outputted. When the outputs of the operation code and the address are completed, the ICP CAMERA data are inputted in the cartridge, and when the CS signal becomes "L" (t8), the ICP CAMERA data are written in the E²PROM 111. The cartridge compares the written ICP CAMERA data with preliminarily stored ICP CAMERA Ref data by means of a comparator 157. When the two data are identical with each other, a signal ROK from the comparator 157 is turned to "H" so that the data can be read (t9). Thereby, a gate 158 becomes conductive, whereby the data can be read. When the ICP CAMERA data and the ICP CAMERA Ref are not identical with each other, the signal ROK remains in "L" level, and the gate 158 remains nonconductive and the data cannot be read.

The data communication between the camera and the film cartridge is described in the above. However, since data for use in a film processing shop and a laboratory are also stored in the memory in the cartridge as shown in FIG. 16, data communication between the film cartridge and the instruments used in a film processing shop and a laboratory can be executed in the same manner as described in the abovementioned embodiments.

The invention may be embodied in other specific forms without departing from the spirit or essential characteristics thereof. The present embodiment is therefore to be considered in all respects as illustrative and not restrictive.

The term "memory in the film cartridge" is used for herein in a comprehensive sense, i.e., to broadly refer to that memory is provided in a film cartridge or film itself, further memory is a medium such as a ROM provided in a film cartridge.

TABLE 1

| C4 | C5 | C6 | C7 | C8 | AND circuit of which output is High level |
|----|----|----|----|----|----|
| L | L | L | L | L | 120 |
| H | L | L | L | L | 121 |
| L | H | L | L | L | 128 |
| H | H | L | L | L | 129 |
| L | L | H | L | L | 130 |
| H | L | H | L | L | 131 |
| L | H | H | L | L | 132 |
| H | H | H | L | L | 133 |
| L | L | L | H | L | 134 |
| H | L | L | H | L | 135 |
| L | H | L | H | L | 136 |
| H | H | L | H | L | 137 |
| L | L | H | H | L | 138 |
| H | L | H | H | L | 139 |
| L | H | H | H | L | 140 |
| H | H | H | H | L | 141 |
| L | L | L | L | L | 142 |
| H | L | L | L | L | 143 |

What is claimed is:

1. A camera capable of setting a range of an image to be produced, comprising:
    means for setting a range of an image to be produced;
    memory means for storing a range limit value, said range limit value capable of being set;
    warning means for giving a warning when the image range set by the setting means reached the range limit value stored in the memory means; and
    permitting means for permitting the setting of image range beyond the limit range value even when a warning is given by the warning means.

2. A camera as claimed in claim 1, wherein the range limit value stored in the memory means is variable, and the value being different for a monochrome color film than for a color film.

3. A camera as claimed in claim 1, wherein the range limit value stored in the memory means is variable, and the value being different for a negative film than for a positive film.

4. A camera as claimed in claim 1, wherein the range limit value stored in the memory means is variable and in accordance with ISO sensitivity of the film loaded in the camera.

5. A camera as claimed in claim 1, wherein the range limit value stored in the memory means is variable, and the value being different according to manufacturing maker of the film loaded in the camera.

* * * * *

UNITED STATES PATENT AND TRADEMARK OFFICE
CERTIFICATE OF CORRECTION

PATENT NO. : 5,208,621

DATED : May 4, 1993

INVENTOR(S) : Nobuyuki TANIGUCHI et al

It is certified that error appears in the above-identified patent and that said Letters Patent is hereby corrected as shown below:

On title page, item [54], and col. 1, lines 1-5, delete
"PHOTOGRAPHIC SYSETM CAPABLE OF RECORDING
THEREIN PHOTOGRAPHING DATA AND READING OUT THE SAME AND FILM
STRUCTURE FOR USE IN THE PHOTOGRAPHIC SYSTEM" and insert
-- PHOTOGRAPHIC SYSTEM CAPABLE OF RECORDING THEREIN PHOTOGRAPHING DATA
AND READING OUT THE SAME AND FILM STRUCTURE FOR USE IN THE
PHOTOGRAPHIC SYSTEM --.

Signed and Sealed this

Seventh Day of December, 1993

*Attest:*

BRUCE LEHMAN

*Attesting Officer*  *Commissioner of Patents and Trademarks*